INVENTORS A. E. BACHELET
H. H. HAAS
N. A. NEWELL
BY
J. P. Kearns Jr.
ATTORNEY

INVENTORS A. E. BACHELET
H. H. HAAS
N. A. NEWELL

Dec. 29, 1959 A. E. BACHELET ET AL 2,919,307
ORDER WIRE ALARM AND CONTROL CIRCUIT
Filed Sept. 24, 1958 19 Sheets-Sheet 10

INVENTORS A.E. BACHELET
H. H. HAAS
N. A. NEWELL
BY
J. P. Kearns Jr.
ATTORNEY

FIG. 12

INVENTORS  A. E. BACHELET
           H. H. HAAS
           N. A. NEWELL
BY
*J. P. Kearns, Jr.*
ATTORNEY

INVENTORS A.E. BACHELET
H.H. HAAS
N.A. NEWELL
BY
ATTORNEY

Dec. 29, 1959   A. E. BACHELET ET AL   2,919,307
ORDER WIRE ALARM AND CONTROL CIRCUIT
Filed Sept. 24, 1958   19 Sheets-Sheet 16

INVENTORS  A.E. BACHELET
H.H. HAAS
N.A. NEWELL
BY
J.P. Kearns, Jr.
ATTORNEY

INVENTORS
A. E. BACHELET
H. H. HAAS
N. A. NEWELL

BY
J. P. Kearns, Jr.
ATTORNEY

United States Patent Office 2,919,307
Patented Dec. 29, 1959

2,919,307

ORDER WIRE ALARM AND CONTROL CIRCUIT

Albert E. Bachelet, New York, N.Y., and Hammond H. Haas, Summit, and Norman A. Newell, Millburn, N.J., assignors to Bell Telephone Laboratories, Incorporated, New York, N.Y., a corporation of New York Application September 24, 1958, Serial No. 763,137

21 Claims. (Cl. 179—5)

This invention relates to an alarm, control and order wire circuit for an electrical communication system and more specifically to such a circuit for supervising a plurality of unattended repeater substations interconnected by wire or radio links from an attended main station.

In order to insure reliability of service in a communication system involving stations which must be operated on an unattended or partially attended basis, it is essential that various trouble or abnormal conditions which originate in the unattended stations be reported promptly to an associated alarm receiving station which is continuously attended. It is also desirable to perform certain functions at unattended stations on a remote control basis from the attended station, such as checking the alarm system and checking the emergency engine alternator. In order to facilitate maintenance and operation, a telephone facility for communicating between stations is required. The alarm, control, and order wire circuit of this invention provides these facilities in a unitary fashion on a single voice channel particularly for light route radio communication systems which, in general, require a relatively small number of alarms and controls. However, the application of the circuit of this invention is not to be considered as limited to radio systems but wire systems as well can be accommodated.

Automatic alarm and control circuits involving a plurality of unattended repeater stations and a main attended station are known in the electrical communication art for the purpose of transmitting alarm information from an unattended station to an attended station. Some of these prior art circuits employ more than one wire channel for transmitting coded pulses between the unattended and attended stations on a direct-current basis, by the use of phantom circuits or separate signaling pairs, for example. Other prior art circuits are usable where a direct-current path is not available between repeater stations; for example, where some of the paths between repeaters comprise radio transmission links, alternating currents in the voice-frequency range may be used for identifying each unattended station, an oscillator of a unique frequency being included for this purpose at each unattended station to be actuated automatically as an alarm indication.

Any of these prior art arrangements may employ varying degrees of automaticity. Some require manual interrogation by the attended station to determine the presence of an alarm condition at an unattended station. Others automatically signal the presence of an alarm condition at an unattended station to the main station, but require manual identification procedures at the main station to determine which unattended station has given the alarm and the nature of the alarm.

This invention differs from these prior art circuits in that it combines in a single transmission loop, whether connecting an attended main station and all unattended subsidiary stations by wire, coaxial cable, or radio paths, an automatic alarm reporting, scanning and registration, control signaling, and order wire talking system. A single voice-frequency tone transmitted from the main station only circulates over a transmission loop including all unattended subsidiary stations and closed at the far-end substation to return to the main station. Presence of tone on the loop at all times indicates the idle condition. An alarm occurring at any unattended substation causes the loop to be blocked to the single frequency tone. In response to the interruption of the tone signal by an alarm condition at a substation or a break in ths transmission loop, the main station begins an automatic transmission of pulsed tone interruptions which cause sequence stepping switches in the unattended stations and at the main station to step. Each substation is identified by a preparatory relay on a particular step on the sequence switch bank and the station having the alarm condition upon being stepped to its unique position closes the loop to the main station, locks out all other substations from the main station, and reverts the next pulse to the main station. The reverted pulse stops the pulsing at the main station and causes an identifying station lamp to light. The main station then automatically transmits a second series of pulses which can now be received only by the alarmed substation. The alarm condition has been stored at a particular step of a second bank on the sequence switch at the particular substation. When the substation sequence switch has been stepped to the alarmed position, the loop is again closed through that substation to the main station and the next succeeding pulse is reverted to the main station to register the particular major or minor alarm and to stop the pulsing. Alarms occurring at other substations during the scanning process are stored until later scanning and registration is possible. Provision is also made for manual scanning and calling the roll of substations.

The same transmission loop and single frequency used for automatic alarm scanning and registration is also adapted to being used for control purposes, i.e., to transmit orders to the substations to carry out certain preassigned operations.

The same control loop is also available as an order wire for talking purposes between the main station and any or all substations and between substations. The signal frequency is so chosen and its level so controlled that little, if any, interference with speech is apparent.

Since the signaling tone is on the transmission loop in the normal idle circuit condition, the tone may still further be used as a pilot frequency by means of which the transmission level may be regulated.

Accordingly, it is a principal object of the invention to supervise a plurality of unattended repeater substations from an attended main station by means of an automatic alarm, control and order wire circuit in a physical wire, coaxial cable, or radio electrical communication system.

Another object is to check the operating conditions at each particular substation at will.

A further object is to check the operating conditions at all substations by means of a roll call.

Another object is to transmit operational order signals to particular substations, and to check the carrying out of such orders.

Another object is to provide an order wire talking path to maintenance personnel between the main station and any substation or between any two substations.

A still further object is to denote automatically at the main station the types and locations of alarm conditions at any substation by means of a common audible signal and individual visual signals.

Another object is to identify the location of a line open fault with respect to the substations.

A main feature of the invention is that all the foregoing objects are attained by the use of a single transmission loop joining the main station and all unattended substations, and a single transmitter at the main station continuously supplying a single tone frequency to the loop.

Another feature is that both the onset and clearing of all alarm conditions are communicated to the main station by blocking the return transmission path to the single tone frequency. The main station then scans the substations by pulsing the tone frequency and the substations identify themselves and the nature of the alarm by reverting pulses to the main station.

A further feature permits the reporting by a substation to the main station of the clearing of an alarm condition.

A still further feature relates to the locking out of all unaffected substations from communicating with the main station until the alarm condition at a particular substation has been reported to the main station.

Another feature is that alarms occurring at one substation while another substation is reporting an alarm condition are held up until the transmission loop has been restored to normal after the one substation has completed its report.

Another feature is that the order wire circuit may be extended beyond the far-end substation on a two wire basis.

Another feature is that each substation is uniquely identified at the main station at a particular terminal on a sequence selector switch at the main station.

Another feature is that each substation is provided with a single frequency tone receiver which converts pulsed interruptions into a ground or open relay contact to step a sequence switch over its banks of terminals.

Another feature relates to protection of the normal automatic alarming condition of the system whereby manual operation for the purpose of transmitting orders to the subsidiary stations is restricted to a predetermined time interval. If an order is not promptly transmitted after a subsidiary station is called in, the system is automatically restored to the normal idle condition.

A still further feature relates to the fail-safe operation of the alarm system. Interruption of tone transmission, whether by operation of an alarm at a substation, opening of the line between substations, or by failure of the signaling equipment itself, immediately alerts the main station to a trouble condition.

The invention will be more readily understood from the following detailed description together with the accompanying drawing in which:

Fig. 1 shows in diagrammatic form the arrangement of equipment in an attended main station and in a first unattended substation;

Fig. 2 similarly shows in diagrammatic form an unattended far-end substation, and Figs. 1 and 2 taken together show the arrangement of the stations in a system;

Fig. 3 shows the manner in which Figs. 4 through 20 should be arranged;

Figs. 4, 5, 6, 7 and 8 taken together constitute the circuits at an attended main station;

Figs. 9, 10, 11, 12, 13 and 14 taken together show the circuit details of a first unattended substation;

Figs. 15, 16, 17, 18, 19 and 20 show the circuit details of an unattended far-end substation;

Figure 1:
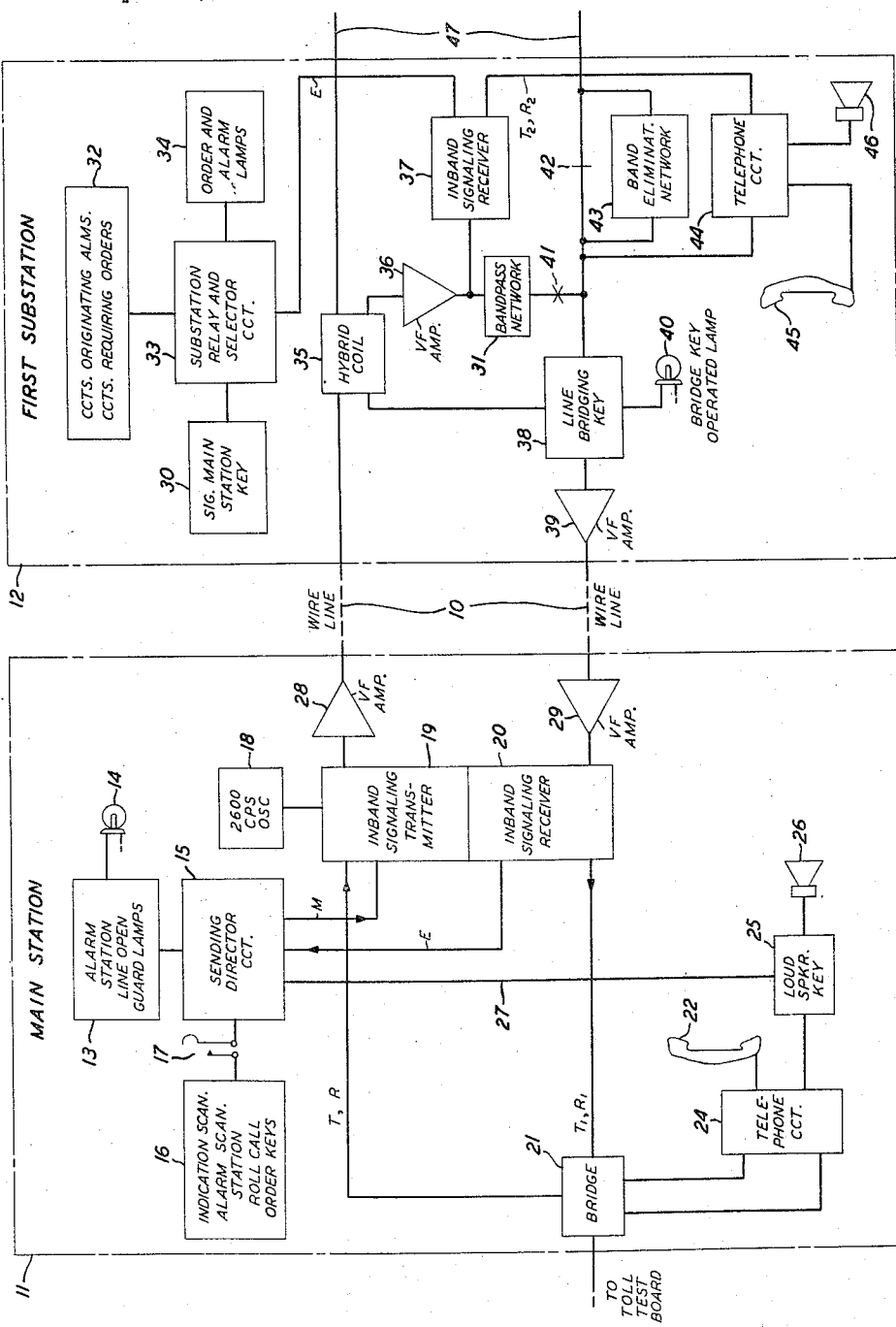

In the drawings the relays are shown in their normal condition when steady signal tone is being transmitted, and no alarms are present. Virtually all relays are in their released condition except for a few at the main station and two at each substation. Also, in the drawing relays and certain other equipment have been given functional letter designations and in this specifications these designations will be followed by the number of the figure in which each relay appears, enclosed in paranetheses, to facilitate locating the relays on the drawings. Slow-release relays are indicated by arrowed lines drawn across the armatures of the relay contacts and pointing away from the relay coil.

GENERAL DESCRIPTION

Fig. 1 shows in diagrammatic form the equipment located at an alarm center called a main station 11, which is continuously attended. The equipment at main station 11 includes an inband signal transmitter 19, which serves to apply an audio-frequency signal from an oscillator 18 to a line outgoing from the main station by way of a voice-frequency amplifier 28; an inband signal receiver 20, which serves to translate the incoming audio-frequency signal tone through voice-frequency amplifier 29 into a direct-current signal; a sending director circuit 15, which serves both to control the application of signal tone to the line outgoing and also to control the registration of alarm conditions on the indicating lamps 13; and a telephone circuit 24.

First substation 12 is typical of the unattended stations in the system and includes an inband signal receiver 37 bridged across the incoming line by way of hybrid coil 35 and voice-frequency amplifier 36 and which serves to translate incoming tone pulses into direct-current pulses; a substation relay and selector circuit 33, which under the control of direct-current pulses over the lead E from the inband signal receiver 37 makes a scan of alarm conditions at that substation; a band-elimination network 43 which is placed in series with the outgoing line under the control of the selector circuit 33 by way of normally closed relay contact 42 to block the tone path back to the main station whenever an alarm condition occurs; and a bandpass filter 31 in series with a normally open relay contact 41 for completing a signal reverting path to the main station when a substation is identifying itself to the main station and an alarm is being reported.

Other equipment associated with the substation relay and selector circuit 33 includes a bank of order and alarm lamps 34, a group of relay circuits for originating alarms and receiver orders 32, a key 30 for signaling the main station, and a signaling lead E joining the inband signaling receiver 37 and the relay and selector circuit 33. A telephone circuit 44 is also bridged from an output of the inband signaling receiver 37 to the outgoing line on leads T2, R2. The telephone circuit provides connection either to a telephone handset 45 or to a loudspeaker 46. In addition, a line bridging key 38 is provided to permit talking between substations when the line to the main station is open. Voice-frequency amplifier 39 supplies the proper output level to the return line to the main station.

Figure 2:
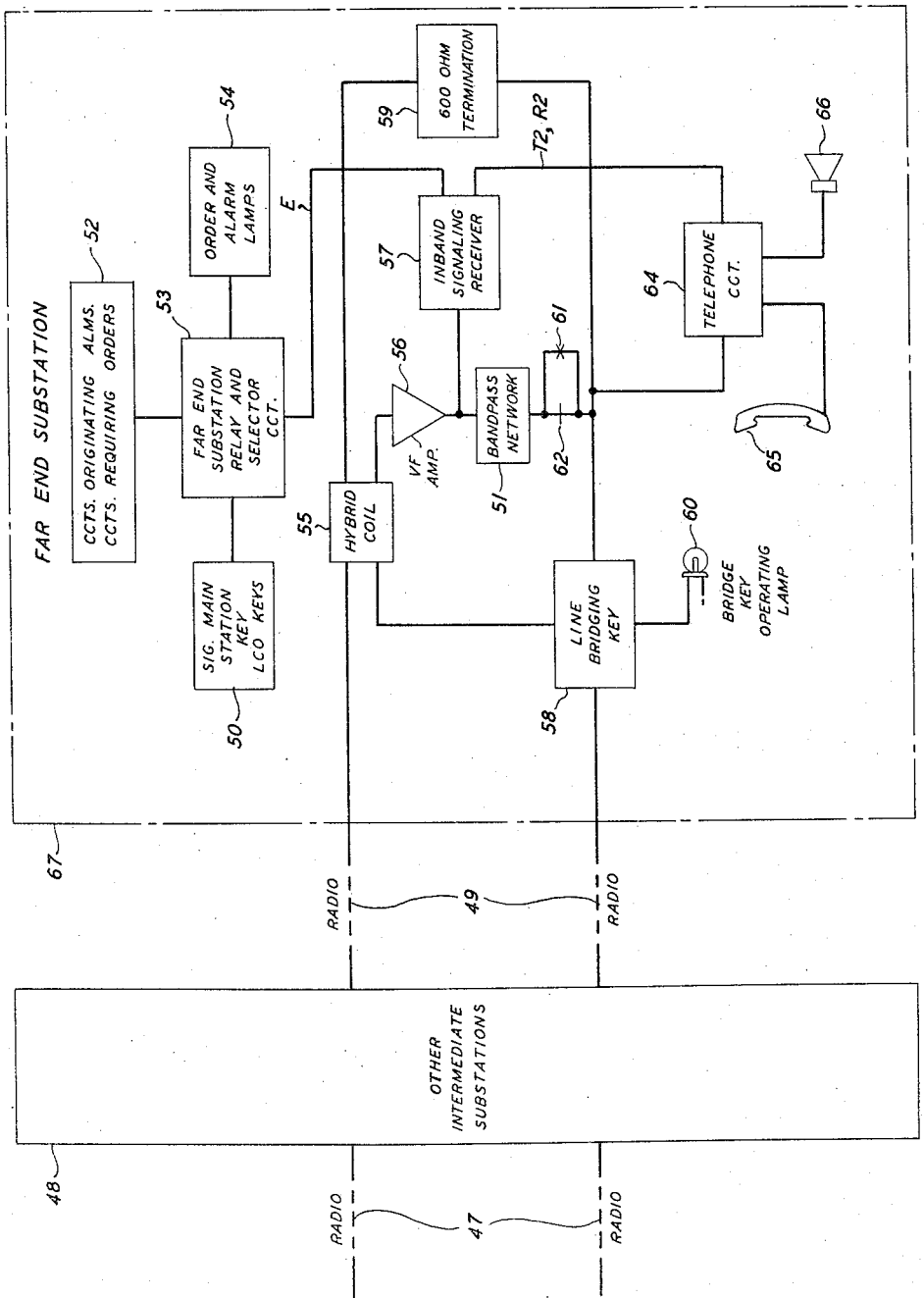

Block 48 in Fig. 2 represents additional unattended intermediate substations in the system. The equipment arrangements in the intermediate substations are substantially the same as those shown in block 12 for the first substation except for the individual connection of a station-identifying relay thereat, and need not be shown in further detail in Fig. 2.

Fig. 2 also shows the equipment arrangement in a far-end substation 67. The equipment at a far-end substation is essentially the same as that at the first substation and similar equipments are numbered in a series beginning with number 50 corresponding to similar equipments shown in the first substation 12 beginning with the number 30. The one substantial difference between the first substation 12 and the far-end substation 67 is the omission of the band-elimination filter network and the inclusion of a 600-ohm termination 59 for the order wire circuit at the output of hybrid coil 55. The tone reverting path through bandpass filter network 51 is normally closed through at the far-end substation by way of normally closed relay contact 62, which opens when an alarm condition arises. Normally open relay contact 61 then restores the reverting path when pulses need to be reverted to the main station in alarm reporting.

It is seen from Figs. 1 and 2 that the main station and the substations may be connected either by four-wire physical line 10 joining main station 11 and first substation 12 in Fig. 1 or by two-way radio links 47 and 49 as shown between the first substation 12 and the other intermediate substations 48 and between other intermediate substations 48 and far-end substation 67, respectively. Where radio links are used between substations it will be understood that channel modulation equipment, which is not shown in the drawing, of a conventional type is necessary. With the specific system described in this specification one main station can receive up to 18 individual alarms from up to 7 unattended stations. These limitations are not to be taken as inherent in the system of this invention, but are merely those imposed by the use of ten-position selector switches for illustrative purposes. It will be obvious to one skilled in the art that well-known pulse counting techniques may be employed to extend the range of the system to additional subsidiary stations.

The signaling for this system is on an inband, single frequency, alternating-current basis. The same four-fire two-way channel that comprises the order wire circuit carries the alarm and control signaling. Line facilities may therefore be by physical or carrier wire circuits, radio circuits, or combinations of these. The inband signal transmitter 19 and receiver 20 at the main station 11 and the inband signal receivers 37 and 57 at the substations are not shown in detail because they are essentially the same as signaling apparatus disclosed in United States Patent 2,642,500 isssued June 16, 1953 to W. W. Fritschi, R. O. Soffel, and A. Weaver. The audio-frequency tone generally used in the signaling system of the patent is 2400 or 2600 cycles. In the alarm and control system, to be described in more detail in this specification, the use of the 2600-cycle signaling tone will be assumed.

Inband signaling circuits of the type disclosed in the aforementioned Fritschi et al. patent as normally used on trunk circuits here provide the means of passing signals between the main station and substations of the system of this invention. The inband signaling system is designed to pass signals over voice-frequency line facilities between the terminals of telephone trunks without mutual interference between signaling and speech transmission. The system accepts signals in a direct-current form on a pulsing lead conventionally designated M on the relay circuit side and transforms them into alternating-current form on the line side. A single distinctive frequency in the voice band is employed for one direction of signaling. This signal tone frequency is applied or removed at one terminal of the line to operate or release a relay at the far end of the line, thereby providing two alternate signal conditions. Steady signaling tone is applied to the line when the trunk is idle and is removed when the line is busy. This choice of signal conditions enables continuous reliable signaling without serious conflict between voice and signal transmission except during pulsing when signaling takes priority and order wire operation is momentarily cut off. During the idle period the steady tone is barely audible on the order wire, but during pulsing the tone level is increased about twelve decibels.

The guard channel principle is employed to avoid false operation of the inband signal receiver by signal frequency present in speech to which the receiver is exposed because of its necessarily continuous association with the line. The guard channel uses frequencies other than the signal frequency to oppose the tendency of false operation owing to signal imitation by speech. The inband signaling receiver inserts a narrow band-elimination filter network centered on the signaling frequency in the voice path when the receiver is operating in order to confine the signal tone within the line connecting the two terminals. Normally, when speech is present signaling tone is absent; for this signal condition the band-elimination network is removed and has no effect on voice transmission. On the occasions when speech and signaling tone are on the line together, the network causes a slight impairment of voice transmission by attenuating signaling frequencies present in the speech along with the signal itself.

The transmitter portion of the inband signaling system is used in the main station only. The signaling transmitter is essentially a means of keying the signaling tone oscillator to the outgoing line under the control of the sending director circuit.

The signaling receiver portion of the inband signaling system is used alike in the main station across the incoming line and in each substation bridged across the outgoing line. The signal receiver converts the absence of tone into a ground on the signaling lead commonly designated E and removes this ground when tone is restored to the line. It is impractical to set up an exclusive signaling path between the main station and each of the plurality of substations. The main station therefore transmits information to all substations on a broadcast basis. All substation signal receivers are operated or released together by application or removal of signaling tone frequency by the main station signal transmitter. Substations may signal the main station by interrupting the tone path thereat in the outgoing line. The use, however, of a common signal frequency imposes the constraint that substations must signal the main station individually and sequentially.

In the alarm and control system of this invention the basic mechanism for transmission of alarm and control information is the action of relay and stepping rotary sequence selector switch circuits at both the attended and unattended stations and an interchange of voice-frequency tone signals between these circuits. Such relays and rotary switches are included at the main station in sending director circuit 15 and at the substations in the relay and selector circuits 33 and 53. The two-way signaling path comprising either a wire line 10, as shown in Fig. 1 or a single voice-band channel of radio links 47 and 49 shown in Fig. 2 is in the form of a "party line" transmission loop beginning at the main station inband signaling transmitter 19, passing through the hybrid coils 35 and 55 in each substation on the outgoing path, looping back to the incoming line through the reverting path including voice-amplifier 56, bandpass filter network 51 and relay contact 61 at the far-end substation 67, again passing through each substation on the incoming path, and ending at the main station signal receiver. The loop is normally closed at the far-end substation 67, and 2600-cycle tone from oscillator 18 in the main station 11 is applied to the outgoing line during the idle or "on-hook" condition. The signaling receivers 37 and 57, for example, are bridged on to the outgoing path at each substation through a connection to hybrid coils 35 and 55, respectively. Whenever tone on the line is detected by signaling receivers 37 to 57 ground is held off the signaling lead E to the relay and selector circuits 33 and 53. Whenever an alarm condition, however, arises at an intermediate substation, the relay and selector circuit 33 operates to mark that substation by opening relay contact 42 in the outgoing path and thereby inserting in the return path to the main station a band-elimination network 43, tuned to 2600 cycles, which then blocks the return of the signaling tone to the main station. At the far-end substation the occurrence of an alarm is signaled to the main station by the opening of the tone-reverting path through bandpass filter 51 by opening relay contact 62.

The signaling receiver 20 at the main station detects the absence of the signaling tone and responds by placing ground on the signaling lead E which calls the sending director circuit 15 into action automatically. The main station then commences to interrogate the substations by transmitting a series of interruptions of the 2600-cycle tone in the form of dial pulse code digits. These coded dial pulses are applied on a broadcast basis to all substations simultaneously. Each dial pulse causes the selector switches in the substations to step one position for each pulse. Each substation is assigned a unique marking position on its own selector switch, so that the lowest number substation in trouble upon reaching a position identifying that station operates a preparatory relay and momentarily closes a reverting transmission path, including voice-amplifier 36 or 56 and bandpass network 31 or 51, for 2600-cycle tone through that station by operation of relay contact 41 in an intermediate substation or 61 in the far-end substation. The next succeeding dial pulse is then reverted to the main station. The main station selector switch is arranged to be one step behind the selectors in the substations. Therefore, the main station recognizes the reverted pulse and operates to stop its own selector switch at a position corresponding to the number of the alarmed substation, to stop its pulse generator, and to light a lamp indicative of the substation alarmed. The number of pulses sent in this first series therefore identifies the substation which reverted the pulse. All the other substations are so arranged as to be made nonresponsive to the next series of pulses because their selectors do not stop at identifying positions.

After a timed tone-off interval which returns all selector switches to normal, the main station signaling transmitter begins its second series of pulses. Because of the lock-out of the unalarmed substations, only the selector switch at the substation identified by the first series of pulses can follow the second series of pulses.

A second bank of terminals on the selector switches at the substations are connected to circuits originating alarms. During the tone-off interval between the first and second series of pulses from the main station, connections are transferred from the first bank of contacts on the substation selector switch which are associated with the identification of substations to the second bank of contacts which are used for the identification of alarms. As the selector switch steps over the second bank of terminals a pulse is reverted to the main station for each terminal with which there is associated an alarm condition. The main station selector switch follows the second series of dial pulses one step behind as with the first series of dial pulses and lights an alarm lamp for each alarm condition subsisting at that substation. An audible alarm is sounded at the main station when an alarm is being reported. Only nine alarms are scanned on this second series of dial pulses. As explained in more detail hereinafter, it is possible by transmitting a third series of dial pulses to scan an additional nine alarms at any substation.

Alarms occurring at any other substation, while alarm information at the first substation is being scanned, are stored until the first scan is completed. When steady signaling tone is reapplied by the main station at the end of the first call, the transmission loop is again broken and a new station and alarm identification scan is begun. This scanning process is repeated until the alarms at all substations have been cleared.

Besides the reporting of the 18 preassigned alarm conditions just mentioned, provision is made for the automatic reporting of a line open fault and a substation equipment failure.

A line fault that causes a break in alarm loop continuity is reported to the main station through a line open scan. A line open fault may be due to an actual open in the physical wire line 10, for example, or a failure of one of the radio transmitters or receivers in lines 47 and 49. Initially the operation of a line open scan is the same as that occurring for an automatic alarm scan. The main station signaling receiver 20 detects the loss of signaling tone on the incoming line, the sending director circuit 15 directs the signaling transmitter 19 to remove signaling tone from the line, and tone pulsing begins.

Where in an alarm scan a pulse is reverted by the substation experiencing an alarm condition to stop the pulse generator, in a line open scan no pulses are reverted and therefore the main station continues to produce pulses until all the selector switches are driven to their top positions. The pulse generator stop circuit at the main station is connected to the tenth position of the selector which then stops the pulse generator and causes a "line open" lamp to light. The signaling transmitter at the main station then reapplies steady signaling tone to the line to normalize all the substations. However, before the main station restores completely an office alarm is sounded to announce the line open condition. Operating the "line open" key 17 will silence this alarm. To obtain the location information on the position of the line open fault a manual roll call must be made as mentioned hereinafter.

The alarm system is self-alarming in the event of failure of certain major equipment elements of a substation, such as failure of the battery supply, tube or parts failure in the signaling receiver 37 or in the voice-frequency amplifier 36. Such a failure manifests itself by a ten-second interruption of the signaling tone loop, which is recognized at the main station in the same manner as a line open failure. A subsequent manual roll call is necessary in this case as with the line open failure to identify the substation having an equipment failure, since that substation cannot at that time respond by reverting pulses to the main station.

Control of certain preassigned operations at any substation may be had from the main station by transmitting certain preassigned tone pulse combinations. The main station is provided with a series of station keys, the operation of any of which will cause the sending director circuit 15 to transmit the proper number of tone pulses to gain access to a particular substation. The main station is further provided with a plurality of order keys which may be used to cause the signaling transmitter to pulse the appropriate signals to actuate order relays at an individual substation. Any of these operations will be referred to herein as transmitting an order.

The operation of two keys is required to send any order. The first key, a station key, is associated with gaining access to the desired substation, and the second key is associated with a particular order function. The first step in transmitting an order to a particular substation is gaining access to the station, that is, making the selected station responsive to further signals, while at the same time preventing all other stations from responding by locking them out. The first digit of an order is therefore used to gain station access, which is accomplished by operating the corresponding station key. This action results in the main station sending a seizure signal or tone-off interval which prepares all substations for reception and counting of pulses followed by a variable number of tone pulses from 2 through 8, depending on the substation concerned. When access to the substation has been obtained, a red guard lamp 14 in Fig. 1 lights in the main station, which signifies that a second key must be operated to complete the call. The completion of the sending of the first digit has resulted in the selector switches at all substations being advanced to and coming to rest on the same position. At the wanted substation the station relay is operated, which establishes access to the station for subsequent operations. At all other substations, however, a lockout circuit takes effect, thereby making these substations nonresponsive to all subsequent digits of the call. Once the station relay has operated at the substation its selector switch is released and restores to normal.

After gaining access to the desired substation an order function key is operated, which results in the sending director 15 pulsing two or more pulses depending on the order to be executed. Among the order functions which may be controlled from the main station at a called-in substation are:

(1) To start the emergency engine alternator;
(2) To reset certain sensitive relays in the radio transmitters;
(3) To order a scan of the indications of up to six diversity switch units at a radio station;
(4) To scan the alarm conditions at that substation;
(5) To close the transmission loop through that substation;
(6) To open the transmission loop at that substation; and
(7) To accomplish a roll call.

Where an order function requires the scanning of indications or more than nine alarms, a third digit is automatically transmitted and revertive pulsing causes the registration of the condition scanned on appropriate indicating lamps at the main station.

One particular order function which is used in the identification of the location of a line open fault or a substation equipment failure is the roll call. The roll call must be performed manually in several steps. If the alarm loop is initially closed at the far-end substation, an "open loop" order must first be transmitted before calling the roll. This results in a line open alarm as previously described, which is silenced by operating the line open key.

Secondly, the roll call itself is initiated by depressing the roll call key. This causes the transmission of a ten-pulse first digit, which is received at all the substations and causes the selector switches to step to position 10. This position applies operating ground to a relay which energizes and connects the reverting path preparatory relay at each substation to bank number 1 of their respective selector switches. Each station makes this connection at a different level of its selector switch, with a station nearest the main station connecting to level 1, the next to level 2, and so forth up to level 7. The selector switches then restore to normal, and a red guard lamp lights at the main station.

Thirdly, the alarm scan key is now depressed at the main station and an 11-pulse scanning digit is generated. The pulses are sent to the substations and advance the selector switches. When the near-end substation selector reaches position 1, it enables the pulse reverting path through bandpass network 31 so that pulse number 2 is reverted immediately preceding the stepping of the selector switch to the next position. At the next station the reverting path is enabled when the selector advances to level 2 so that the third pulse is reverted, and so forth. Each substation that is capable of receiving pulsing, responding properly thereto, and that is not prevented by a line open fault from reverting pulses to the main station, will be identified by the sending director and alarm receiving circuits, resulting in the lighting of corresponding station lamps. On the other hand, if no response is received from a given substation, the corresponding lamp will not be lit indicating that either there is trouble in the substation equipment or a line open fault exists between that substation and the main station. If a substation is in trouble, its associated station lamp will not be lit. If an open line is involved, the station lamps will be lit up to the point of the open, beyond which the lamps will be dark. If a substation equipment failure is involved, all station lamps except that of the faulted substation will be lit.

The same line facilities used for alarm and control signaling comprise the talking path between the main station and a substation and also between any two substations. The talking path constitutes the order wire. The order wire comprises the five-leg bridge 21 in the main station which makes connection to the toll test board, to the telephone circuit 24, to the inband signaling transmitter 19 by way of leads T, R, and to the inband signaling receiver 20 by way of leads $T_1$, $R_1$; the four-wire line 10 to the first substation 12, through the hybrid coil 35 on the outgoing two-wire line portion through the line bridging key 38 and the voice-frequency amplifier 39 on the incoming two-wire line portion; through the transmitting and receiving channels of the radio links 47 and 49 through the other intermediate substations 48; and to the far-end substation through the hybrid coil 55 on the outgoing two-wire line portion and through the line bridging key 58 on the incoming two-wire line portion. Each substation includes a telephone circuit 44 bridged from the voice-frequency output line $T_2$, $R_2$ of the inband signaling receiver 37 through the telephone circuit 44 to the outgoing line. Similarly, the far-end substation includes the telephone circuit 64 bridged from the voice-frequency output $T_2$, $R_2$ leads of the inband signaling receiver 57 to the outgoing line. A 600-ohm termination 59 is connected from one output of the hybrid coil 55 to the return line at the far-end substation. If order wire communication is desired to points beyond the far-end substation, the 600-ohm termination 59 may be replaced by a four-wire termination set (not shown).

Substations employ four-wire telephone sets, including for example handset 45, the transmitting circuits of which are connected to the return side of the four-wire line and receiver circuits are connected to the other side. At the main station the two paths, incoming and outgoing, are connected together through the resistive bridge 21. This bridge also provides the means of connection to the four-wire main station telephone set and to the toll test board. Each substation and the main station are also equipped with a loudspeaker 26, 46, or 66 for voice communication on the order circuit. Voice calling to the loud-speakers is employed between all stations, but substations normally ring down the main station by a process similar to the station identification involved in transmitting alarms. Each substation is equipped with a bandpass filter network 31 or 51 for passing the 2600-cycle signaling tone only in the pulse reverting path of the substation. These bandpass filter networks substantially eliminate a sidetone path at the substations between the transmitters and receivers of the order wire circuit. The substation is also equipped with a line bridging key 38 or 58 which makes possible communication between substations when there is an open in the line between the main station and the nearest substation.

DETAILED DESCRIPTION

*Alarm originates at a substation*

Figs 9 through 14 show in detail the circuit arrangement at a typical substation, which for our purposes may be considered the first substation. These figures can best be understood by laying them out in accordance with the diagram of Fig. 3 insofar as it is applicable thereto.

The transmission path through the first substation in the incoming direction comprises the top two-wire pair of line 10, the hybrid coil 901, and the top circuit path of the radio channel 1302. The outgoing or return transmission path includes the bottom channel of the radio link 1302, band-elimination filter network 1104, two-wire line 909, telephone bridging network 907, the bridging key in Fig. 9, voice-frequency amplifier 903, and the bottom two-wire pair of wire line 10. Bridged to the hybrid coil 901 is the circuit path to the inband signaling receiver 906, which includes voice-frequency amplifier 905; and also the order wire talking path which further includes line 902, telephone circuit 1102, two-wire line 908, and the telephone bridging network 907. The Bridging key is used for order wire talking purposes between substations, as hereinafter explained, and has associated therewith a Bridge Key Operate lamp. The bridging key may be operated to connect the hybrid coil 901 directly to the voice-frequency amplifier 903 and the outgoing portion of line 10. A pulse reverting path is provided from the output of voice-frequency amplifier 905 by way of the bandpass filter network 904, which is tuned to the 2600-cycle frequency of the signaling tone, leads 921 and 922 and through a series of relay contacts back to the telephone bridging network 907 and the outgoing line. All of the elements included in the transmission portions of the substations are considered to be conventional in nature and will not be described herein in detail.

The remainder of the substation circuit comprises the relay and selector circuit control means. A ten-position rotary selector switch having a first bank of terminals A–1(11) and a second bank of terminals A–2(12) is connected through its first bank of contacts in the alternative to the STA(10) station-identifying, P(9) pulse-reverting, and LO(10) lockout relays or to the order relays OR–1(13) through OR–5(13), OL(11), CL(9) and E(10). The second bank of contacts is connected in the alternative to a first group of nine alarm relays numbered AL–1(14) through AL–9(14) and to a second group of nine alarm relays designated AL–10(14) through AL–18(14). In addition to the selector relay, there is included the line relay A(10) under the direct control of the inband signaling receiver. The A(10) relay operates during the seizure period and follows dial pulses. Relay B(10) is a slow release relay which is also operated during the seizure period by relay A(10) and then holds itself operated for the duration of a call. Relay C(10) is a slow-release relay controlled by the A(10) relay which holds operated during a single digit or train of dial pulses. Release of the C(10) relay determines the beginning of the interdigital time. Relay D(10) is also a slow-release relay which is controlled by the release of relay C(10) and provides a step of delay between the time the selector switch comes to rest and then releases. The station relay STA(10) gives access to the circuit and must first be operated before an order can be executed or an alarm scan can be made. The STA(10) relays at the various substations are connected to the respective selector switches at different positions, and no two are alike. When the selector switches come to rest at a given position, the STA(10) relay in the desired substation will be operated, but in all the undesired substations the lockout relay LO(10) will be operated. The operation of the lockout relay LO(10) opens a pulsing lead to the rotary magnet, thereby preventing the selector switch from operating.

Figure 14:
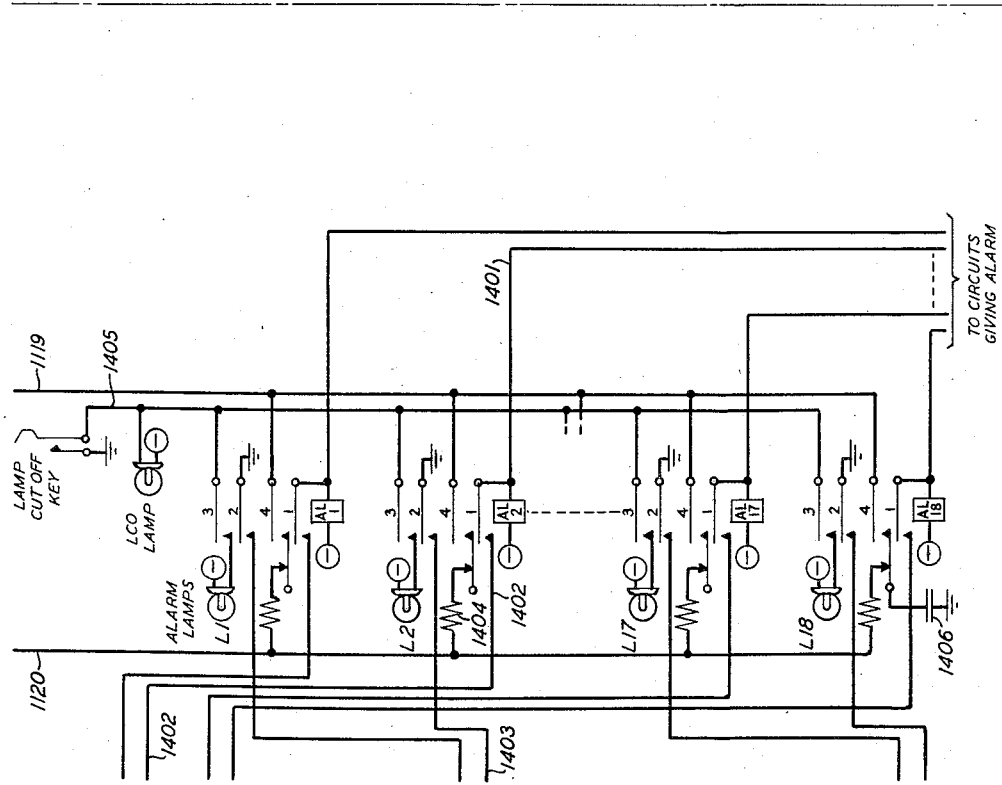

Whenever an alarm condition arises, a ground over an alarm lead from one of the circuits giving an alarm is connected to the operating winding of one of the alarm relays AL–1 or AL–18 in Fig. 14. Operation of any of the alarm relays ionizes gas tube 1114 in Fig. 11. Ionization of the gas tube 1114 in turn operates relay OP(9). Operation of the OP(9) relay blocks the return of 2600-cycle signaling tone to the main station by introducing band-elimination network 1104 into the outgoing line. Once the alarm relay operates, it locks operated for the scanning period on contacts of relay Z(12).

The main station responds to the interruption of the incoming steady tone by first removing tone from the outgoing line for a timed interval and then pulsing two or three digits to the substations, depending on whether the substantion can report fewer or more than nine alarms. This action of the main station will be described in more detail hereinafter.

The initial removal of tone prepares all substations for the subsequent counting of pulses by operating the A relays which in turn operate the B relays and partially close the pulsing lead to the selector switch stepping magnet.

The first digit received at the substations causes all selector switches to step sequentially over the contact banks. At the substation alarmed, the P(9) relay operates on a preassigned level during the first digit and holds up to revert the next pulse to the main station where pulsing thereupon ceases. The STA(10) relay operates at the alarmed substation to transfer the selector switch contacts to the alarm relays by means of the transfer relay TRANS(11), and the LO relay operates at all other substations to open the operating path to the selector magnet ROT(10) and thereby prevent their selectors from operating on the second and third digits. All selectors are then restored to normal in preparation for the following digits.

The second digit again steps the selector switch at the alarmed substation only, over its contact banks; and for each alarm condition the P(9) relay is operated to revert the next pulse to the main station for registration thereat. On the tenth pulse of the second digit the E(10) and ADD–9(12) relays operate to prepare for the reception of the third digit if the alarmed substation is provided with more than nine alarm relays. The selector switch presently restores to normal. The ADD–9 relay transfers the leads of the second bank of the selector switch to the second group of nine alarm relays.

On the third digit, if required, the second group of nine alarms is reported to the main station in the same manner as the first group. After all alarms are cleared, all circuits restore to normal and the main station reapplies steady tone to the line. Alarms arising at any other substation during the scanning of the prior substation may now be reported in the same manner.

For the following detailed description of the mechanism of reporting an alarm condition from a substation, let it be assumed that an alarm condition has occurred on the second alarm of the first substation. Ground is placed on lead 1401 which is connected to alarm relay AL–2(14) and thereupon operates relay AL–2 which is already supplied with —48-volt negative battery as indicated by the encircled minus sign. Relay AL–2(14) operated (*a*) prepares a locking path to ground over its make-contact 1 by way of lead 1402 to contact 2 on relay Z(12) for the purpose of holding the alarm condition; (*b*) connects ground to the second level of bank A–2(12) of the selector switch by way of its own contact 2, lead 1403, break-contact 2 of the ADD–9(12) relay and through the break-contact 2 on the T(12) relay; (*e*) closes a circuit for lighting alarm lamp L2 by way of contact 3 connected to ground on the Lamp Cutoff key to indicate the existence of the alarm; and (*d*) applies a pulse to the grid of gas tube 1114 by way of resistor 1115, varistor 1116, lead 1119, resistor 1404, its own momentarily closed make-before-break contact 4, lead 1120 and 130-volt positive battery indicated by the encircled plus sign connected to the anode of gas tube 1114 in Fig. 11, thereby causing the gas tube 1114 to ionize.

Parenthetically it may be noted that the locking Lamp Cutoff key in Fig. 14, when operated, supplies ground over lead 1405 to the armatures 3 of all alarm relays in common. This key is normally left open except when maintenance personnel are working at the substation. The cutoff lamp LCO lights as an indication that the cutoff key is operated. Leads 1119 and 1120 connecting to positive battery and the grid of the gas tube 1114, respectively, in Fig. 11 also have common connections to opposite terminals of break-contacts 4 on all alarm relays. Each alarm relay also has an associated alarm lamp, such as lamps L1, L17 and L18 shown with alarm relays AL–1, AL–17 and AL–18 in Fig. 14

Gas tube 1114 is a conventional thyratron tube having an anode, cathode and grid. The anode is supplied with positive voltage from the source identified by the encircled plus sign in shunt with which is connected smoothing capacitor 1118. The cathode is connected to the upper winding of the OP(9) relay by way of leads 1002 and 941. The grid is grounded through resistors 1115 and 1117 and varistor 1116, which is poled to prevent the application of negative-voltage to the grid.

Positive voltage in the grid causes the tube to ionize in the usual manner.

When gas tube 1114 ionizes, current flows from positive battery through the anode-cathode space of the tube over leads 1002 and 941 to the upper winding of relay OP(9) and returns by way of lead 936, break-contact 6 of relay B(10), lead 1017, and ground on break-contact 6 on the STA(10) relay. Thus, relay OP(9) is operated, and in turn (a) operates relay Z(12) from ground on its make-contact 10 and lead 938 to hold the alarm relay operated until the scanning operation has been completed; (b) effectively connects the 2600-cycle band-elimination network 1104 by the opening of its break-contact 7 and the closing of its make-contact 8 in the outgoing transmission path to the main station to block the flow of 2600-cycle tone to the main station; and (c) connects the winding of relay P(9) by way of lead 929, middle contacts of Signal Main Station key and leads 1106 and 930, its own make-contact 6, lead 932, break-contact 11 of non-operated relay OL(11), lead 933, break-contact 1 of the E(10) relay, lead 1028, and break-contact 1 of the TRANS(11) relay to position number 1 on the A-1 bank of the selector switch.

It may be noted that the lower winding of the STA(10) relay is connected to the A-1 bank of the selector switch over lead 939 one level higher, that is, position number 2 in the first substation, than the P(9) relay for a purpose to be described later. The P(9) and STA(10) relays at all substations are connected one level apart to unique positions of the A-1(11) bank of the selector switch by way of strapping terminals indicated in Fig. 11 by the encircled crosses on the leads from the A-1(11) selector switch bank, which are designated by the letters A through H for one set of terminals and 1 through 8 for the other set. At the first substation, therefore, the P(9) relay is connected to level one and the STA(10) relay is connected to level two. Levels three through eight are strapped together and to the lockout relay LO(10). Levels 9 and 10 are connected to the lower winding of the STA(10) relay and to the E(10) relay, respectively, for purposes to be described later. At the far-end substation, which is assumed to be the seventh substation, the P(15) relay is connected to the seventh level of the A-1(17) selector switch bank and the STA(16) relay, to the eighth level by the connections at the strapping terminals. All other intermediate substations are correspondingly strapped. The following table gives the connections of the lettered terminals to the numbered terminals at the strapping block for all substations.

| Numbered terminals | Lettered terminals at substations | | | | | | |
|---|---|---|---|---|---|---|---|
| | 1 | 2 | 3 | 4 | 5 | 6 | 7 |
| 1 | A | B | C | D | E | F | G |
| 2 | B | C | D | E | F | G | H |
| 3 | C | D | E | F | G | H | A |
| 4 | D | E | F | G | H | A | B |
| 5 | E | F | G | H | A | B | C |
| 6 | F | G | H | A | B | C | D |
| 7 | G | H | A | B | C | D | E |
| 8 | H | A | B | C | D | E | F |

The operating path for the STA(10) relay at the first substation may be traced from negative battery at break-contact 5 of the C(10) relay, lower winding of the STA relay, lead 939, break-contact 2 of the TRANS(11) relay, and finally to position 2 on the A-1(11) of the selector switch.

With relay Z(12) operated by the OP(9) relay, as previously mentioned, the alarm relay AL-2(14) is held operated by make-contact 2 of the Z relay, lead 1402, and make-contact 1 of the AL-2 relay in case the operating ground on lead 1401 is removed. If the operating ground on lead 1401 should be removed after the Z(12) relay operates, the alarm relay will hold operated for the scanning interval and will nevertheless reveal the alarm to the main station. When the substation is restored to normal, after the scanning interval, the alarm relay will release if the operating ground has been removed.

Figure 21:
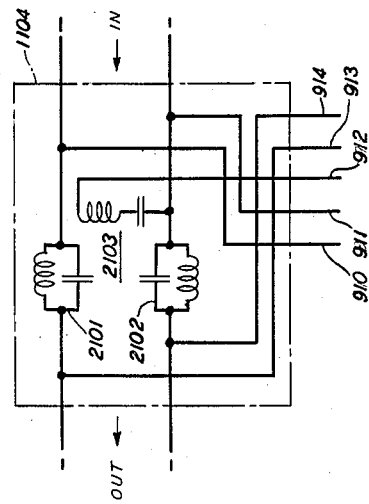
Fig. 21 is a schematic diagram of a band-elimination filter used at a substation for blocking signaling tone when an alarm condition occurs.

Reference is made to Fig. 21 which shows schematically the circuit of the band-elimination network 1104, which is cut into the return line to the main station upon operation of the OP(9) relay. The band-elimination filter is a four-terminal network having an input pair of terminals marked In and an output pair marked Out. The In terminals connect to the incoming two-wire pair of line 1302 and the Out terminals connect to the telephone bridging hybrid network by way of leads 909. Internally the filter comprises parallel-resonant networks 2101 and 2102 in series with the In and Out terminals and a series-resonant network 2103 connectable in shunt with the In terminals. All three resonant networks are tuned to the signaling frequency of 2600 cycles. The two parallel-resonant networks 2101 and 2102 thus present a high series impedance to the passage of 2600 cycles and the series-resonant network 2103 offers a low shunt impedance thereto. When contacts 7 and 8 of the OP(9) relay are in their normal condition, leads 910 and 913 and leads 914 and 911 are shorted together across the networks 2101 and 2102 and leads 910 and 912 are disconnected, leaving network 2103 out of the circuit. Therefore, the In and Out terminals are connected together as a pair and offer no impedance to the transmission of signal tone. When the OP(9) relay operates, however, network 2103 is connected in shunt of the In terminals and the short circuits around networks 2101 and 2102 are removed. 2600-cycle tone is effectively blocked, but speech currents other than 2600 cycles are allowed to pass down the line.

When by the operation of the OP(9) relay band-elimination network 1104 is inserted in the incoming line to the main station to block the 2600-cycle signaling tone therefrom, the main station responds by first removing 2600-cycle tone from its outgoing line preparatory to sending dial-pulse digits. The removal of tone by the main station is recognized as a seizure signal by the inband signaling receiver 906 at the substation which thereupon assumes an off-hook condition by grounding the E lead, which is connected to the operating winding of the A(10) line relay. Relay A(10) in operating supplies ground by way of its make-contact 4 and lead 1011 to the operating winding of the B(10) relay. The B relay in turn provides a holding ground for locking up relays LO(10), E(10), T(12) and STA(10), by way of its make-contact 10 and leads 1013, 1014, 1015 and 1007; for the AUX(10), OP(9), TRANS(11), and the order relays OR-1 through OR-5(13) by way of its make-contact 4 and leads 1004, 1003, 1006 and 1026; for the brush of the first bank A-1(11) of the selector switch by way of its make-contact 12 and lead 1005; and provides an additional holding ground for relay Z(12) by way of its make-contact 8 and leads 937 and 938. Relay B(10) in operating also partially closes the pulsing lead 1012 through its make-contact 2, break contact 7 of the LO(10) relay, lead 1016, make-contact 4 of the D(10) relay and lead 1021 to the selector operating magnet ROT(10). Relay B(10) also transfers the cathode of gas tube 1114 from the operating winding of the OP(9) relay to resistance 1001 to reduce the current flowing through the gas tube by way of its make-before-break contact 6 at the same time that the OP(9) relay is locked up on its lower winding by way of break-contact 9 of the unoperated AUX(10) relay.

The main station now begins the identification scan. When the first pulse of the 2600-cycle signaling tone is received at the substation, the inband signaling receiver 906 removes ground from the E lead, thereby releasing relay A. Relay A(10) released operates relay C(10) through its grounded make-contact 4 by way of pulsing lead 1012, contact 2 of the operated slow-release relay B(10), lead 1025, off-normal contacts On of the selector switch, and lead 1024. The operating winding of relay C(10) is already directly connected to negative battery. Relay C(10) operated, operates relay D(10) through its grounded make-contact 4 and lead 1019. Relay C(10) also removes battery from the relays connected to its break-contacts 5 and 9, namely, STA(10), LO(10), OL(11), CL(9), T(12), and the order relays in Fig. 13. The latter relays are then prevented from operating while the selector switch is in motion. Relay C(10) also prepares an operating path to ground by way of its make-contact 6 for the AUX(10) relay which is finally operated by the STA(10) relay.

The operation of relay D(10) closes the pulsing lead 1016 through its make-contact 4 to the selector switch stepping magnet ROT(10) by way of lead 1021 and also connects together leads 943 and 944 to the telephone bridging circuit 907 by way of its make-contact 6. Leads 943 and 944 connected together short-circuit the telephone circuit to exclude irrelevant frequencies, such as those of voice and room noise, from entering the transmission circuits and the guard circuit of the inband signal receiver located at the main station.

The operation of the stepping magnet ROT(10) steps the selector switch to the number 1 position. At this time the ON(10) contacts of the selector switch also close to prepare an operating path by way of break-contact 9 of the D(10) relay, leads 1020 and 1023 to the release magnet RLS(10) of the selector switch. However, relay D(10) is a slow-release relay which will not release until the completion of the identification scan. Since we are considering the operations to be taking place at the first substation, the stepping of the selector switch to position 1 on the A-1 bank of contacts causes the P(9) relay to operate. The operating path for the P(9) relay can be traced from ground on the brush of the selector switch through position 1 on the A-1(11) bank of contacts, break-contact 1 on the non-operated TRANS(10) relay, lead 1028, break-contact 1 of the E(10) relay, lead 933, break-contact 11 of the OL(11) relay, lead 932, make-contact 6 of the operated OP(9) relay, lead 930, lead 1106, middle contacts of the Signal Main Station key, and lead 929 to the operating winding of relay P.

The position of the level of the selector switch to which the P relay is connected varies with the substation, as previously explained, and no two substations are alike on any one order wire circuit. The first substation is connected to position 1; the second substation is connected to position 2; and so forth through the seventh substation which is connected to position 7. Whichever the substation, when the selector switch reaches the position to which the P relay is connected, the P relay will operate.

When the P(9) relay operates it connects the incoming transmission line to the outgoing transmission line so that the next pulse will be reverted to the main station and stop the pulse generator. The incoming transmission line is represented by leads 921 and 922 from hybrid coil 901, voice-frequency amplifier 905, and bandpass filter 904. These leads are connected by the 8 and 9 make-contacts of the P(9) relay to leads 923 and 924. Leads 923 and 924 connect in turn to the telephone bridging network 907, and thence through the Bridging key and the voice-frequency amplifier 903 to the return two-wire portion of wire line 10. Whenever a second pulse is received from the main station, relay A(10), which has been operated during the interpulse period, is again released. The release of relay A(10) again causes the selector switch to step another level to position 2. The STA(10) relay is connected to position 2 on the bank A-1 of the selector switch as already explained, and at the end of the pulse train relay C(10) releases, thereby connecting battery over its make-contact 5 to the STA(10) relay, causing it to operate. The operation of the STA(10) relay first removes ground by its break-contact 6 and lead 1017 from the resistor 1001 and allows the gas tube 1114 to deionize, and then holds the relay OP(9) operated by way of the make portion of its contact 6 through lead 935. The STA(10) relay also operates the TRANS(11) relay through its make-contact 8 and lead 1008 and make-contact 4 of the AUX(10) relay from ground on contact 6 of the C(10) relay, when the latter relay operates the second time. The release of relay C(10) also releases relay D(10) by the opening of its contact 4. The release of relay D(10) energizes the release magnet RLS(10) by closing its contact 9 to ground over lead 1020, ON(10) contacts and lead 1023. The operation of the RLS(10) magnet restores the selector switch to normal and releases the ON(10) contacts thereof. The STA(10), AUX(10) and TRANS(11) relays are then locked under the control of relay B(10) on leads 1013, 1006 and 1003, respectively.

The operation of the AUX(10) relay connects ground through resistor 1001 to the cathode of gas tube 1114 so that alarms occurring during the scanning process will be reported to the main station on a subsequent scan, and removes the locking ground from the lower winding of relay OP(9) by way of its break-contact 9 and lead 1026. However, the OP(9) relay remains operated through its lower winding on contact 6 of the STA(10) relay. The operation of the TRANS(11) relay connects bank A-1(11) of the selector switch to the order relays and also closes an operating path through its make-contact 10 from the brush of the A-2(12) bank of the substation selector switch to the operating winding of the P(9) relay. This path extends from the A-2(12) brush of the selector switch over lead 1201, contact 10 of the TRANS(11) relay, lead 1106, middle contact of the Signal Main Station key, and lead 929 to the operating winding of the P(9) relay.

After the pulse generator at the main station has been stopped by the reverted pulse, there follows another timed tone-off interval preparatory to the transmission of the alarm identification pulse train. Relay A(10) again operates during this tone-off interval and again pulses relay B, which has not had time to release after the first pulse train. When the pulses of the second digit are transmitted from the main station, relay A(10) releases as before once for each pulse, causing the selector switch to advance accordingly. For an alarm scan the selector switch advances to the tenth position.

The selector switch passes over contacts 1 to 10 on bank A-2(12) of the selector switch and causes the relay P(9) to operate from ground on contact 2 of each of the alarm relays which are operated. The operation of the P(9) relay loops the transmission line back to the main station in preparation for reverting the next pulse. If, for example, alarm relay AL-2(14) were operated, ground on its contact 2 would be extended over lead 1403, break-contact 2 of the ADD-9(12) relay and break-contact 2 of the T(12) relay to position 2 on the A-2(12) bank of the selector switch, and the P(9) relay would operate when the switch advances to position 2. The remainder of the operating path for the P(9) relay has been traced previously.

Figure 22:
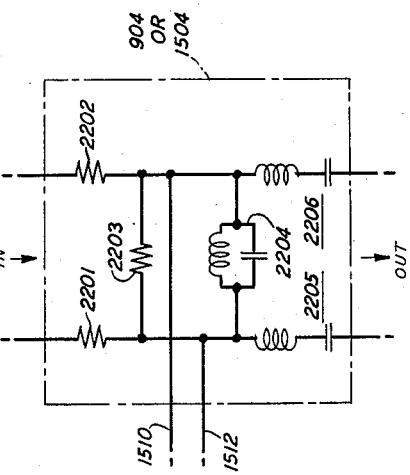
Fig. 22 is a schematic diagram of a bandpass filter used at a substation in the tone reverting path.
Figure 20:
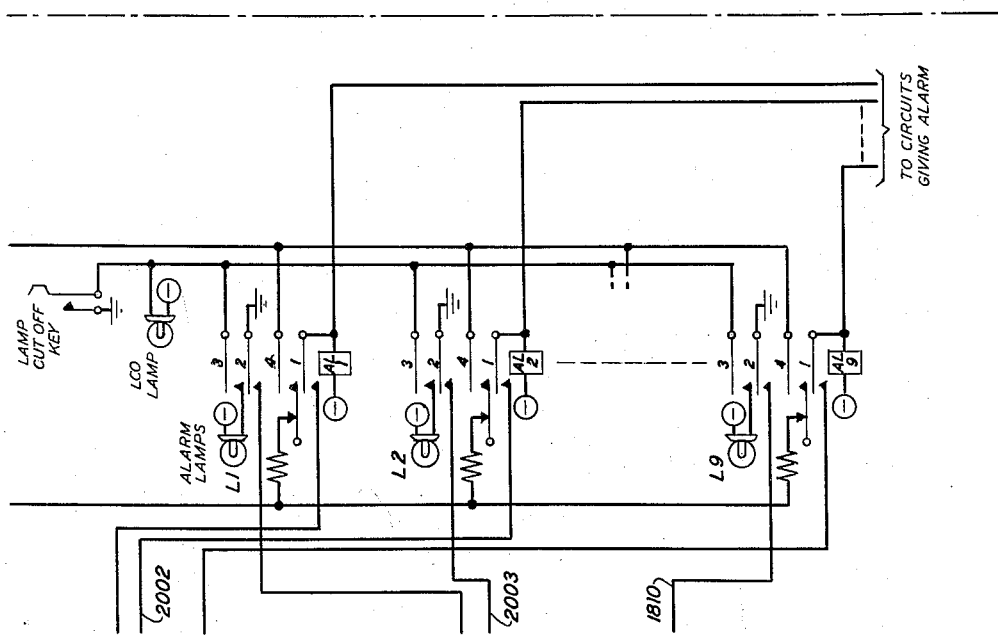

The bandpass filter network 904 located in the reverting path to prevent speech currents from passing therethrough is shown schematically in Fig. 22. This filter is a four-terminal network having an input pair of terminals designated In and an output pair designated Out. The In terminals connect externally to the output of the voice-frequency amplifier 905 in Fig. 9 and the Out terminals connect to the leads 921 and 922. Across the In terminals internally is connected the resistive pad comprising resistors 2201, 2202, and 2203. In shunt of the resistor 2203 is a parallel-resonant network 2204 which is tuned to 2600 cycles, and in series with the Out terminals are series-resonant networks 2205 and 2206, also tuned to 2600 cycles. The parallel-resonant network 2204 presents a high impedance to 2600-cycle current, but a low impedance to all other frequencies. Correspondingly, series-resonant networks 2205 and 2206 exhibit a low impedance at 2600 cycles but tend to block all other frequencies. The bandpass network therefore allows 2600-cycle signal tone to pass freely through the reverting path but blocks speech currents of other frequencies. Leads 1510 and 1512 are used only in the far-end substation for a purpose to be described hereinafter.

At the time the P(9) relay operates, the pulse which caused its operation is no longer present. However, when the following pulse is transmitted it reverts back to the main station by way of the bandpass filter network 904, leads 921 and 922, contacts 8 and 9 of the P relay, leads 923 and 924, telephone bridging network 907 and voice-frequency amplifier 903 just prior to the stepping of the selector switch because of the delay inherent in the inband signal receiver 906. A corresponding alarm lamp is lighted at the main station. The third pulse also steps the selector switch to position 3 and if no alarm ground is present at that level, the P(9) relay releases. If there were a ground present on the third level, the P(9) relay would be held operated and the fourth pulse would be reverted to the main station to light another alarm lamp. This process continues until all of the first nine alarms have been scanned.

When the selector switch stops on position 10 on the A–1(11) bank of the selector switch, position 10 on the A–2(12) bank being unused, the E(10) relay operates over lead 934 and connects ground on its contact 3 by way of lead 1027, contact 10 of the STA(10) relay and lead 1010 to the operating winding of the ADD–9(12) relay, causing the latter to operate. The operation of the ADD–9 relay transfers the A–2(12) bank of the selector switch from the alarm relays 1 through 9 to the alarm relays 10 through 18. The release of C(10) relay at the end of the second train of pulses releases the D(10) relay as before and restores the selector switch to normal to condition the substation circuits for the reception of the third train of alarm scanning pulses. If a third train of pulses were transmitted, the circuits would function in a manner similar to that in connection with the transmission of the second digit except that the alarm relays 10 to 18 would be scanned by virtue of the operated ADD–9(12) relay. After the third digit has been transmitted all operated relays release, the selector switch releases and the circuit restores to normal.

If another alarm were to come in at any time while the prior alarms were being scanned, the gas tube 1114 would again ionize, the cathode being grounded through resistor 1001 at the AUX(10) relay as indicated above. The alarm information would be stored in the gas tube until the circuit normalizes upon the release of relay B(10). The new alarm causes the transfer of the cathode of the gas tube 1114 from the resistor 1001 to the secondary winding of the OP(9) relay, thereby preventing the latter relay from releasing. A signal is now given to the main station of the alarm that came in during the seizure. The continued operation of the OP(9) relay again blocks the tone path to the main station, and the main station responds by removing the signal tone from the line long enough to reoperate the A(10) and B(10) relays. The operation of the B(10) relay transfers the cathode of gas tube 1114 from the OP(9) relay back to the 1001 resistor. During the first train of pulses the STA(10) relay again operates, and the gas tube 1114 deionizes by opening its cathode circuit at the break-contact 6 of the latter relay. Upon subsequent operation of the AUX(10) relay, the cathode circuit of the gas tube is again closed so that any alarms which may come in during the period of seizure will again be stored by the tube.

It is clear from a consideration of the circuit of the alarm relays, such as alarm relay AL–2(14) at the first substation, that should the alarm that caused the initial operation of the AL–2(14) relay prove to be transitory and clear itself during the first complete scan a second impulse will be delivered to the gas tube 1114 when the alarm relay is released at the end of the first scan. Contact 4 of the alarm relay will again momentarily close positive battery to the firing grid of the gas tube and maintain operation of the OP(9) relay, again alerting the main station which responds by pulsing a second scan. Under this condition the alarm lamp at the main station would probably not have been canceled by the attendant there and will remain lit after the second scan even though no pulse is reverted. In addition, an alarm check lamp at the main station will light as hereinafter described to inform the attendant that a second scan has occurred and that a manual scan is required to establish the true state of the alarms at the particular substation. The manual alarm scan will then show definitely that the alarm condition has cleared since no pulse will be reverted on the manual alarm scan.

In a similar manner the clearing of an alarm at any time will be reported to the main station, but at the end of the scanning process a station lamp only will be lit at the main station to indicate the substation at which the alarm has cleared. No alarm lamps will be lit because no pulses are reverted for a cleared alarm.

In the event that the reporting of a cleared alarm is not desired, the circuit at contact 4 of an alarm relay may optionally be arranged so that a small capacitor, such as that designated 1406 on alarm relay AL–18 at the first substation in Fig. 14 is connected to ground on the otherwise floating front contact portion of contact 4. This capacitor charges to the positive voltage during the released period of the alarm relay, and delivers an impulse to the gas tube immediately on the operation of the alarm relay in the manner previously described. However, during the time that the alarm relay is operated, this capacitor discharges completely through resistor 1117 in shunt with the grid of the gas tube 1114. Therefore, when the front and back portions of contact 4 of the alarm relay momentarily close upon the release of the relay, the capacitor can only recharge slowly from positive battery and the connection to the grid of the gas tube is broken before the voltage across the capacitor rises to the firing voltage level of the gas tube.

During the time that a given substation is busy with a main station, all other substations are locked-out by their respectively operated LO relays. It will be noticed that all of the positions of the A–1 bank of the selector switch not connected to either the P relay, the STA relay or the E relay are strapped together. At the far-end substation shown in Figs. 15 through 20, for example, the strapped connections are connected to the operating winding of the LO(16) relay by way of leads 1531 and 1542. The upper operating winding of the LO(16) relay in turn is also connected by way of leads 1543 and 1540 and break-contact 9 of the C(16) relay to negative battery. Therefore, at the completion of the transmission of a digit, when the C(16) relay releases the LO(16) relay will be operated. The operation of the LO(16) relay opens by way of its break-contact 7 the operating path to the rotary magnet ROT(16) through leads 1616 and 1621 and make-contact 4 of the D(16) relay. The B relay is also operated at all substations, which in turn holds the LO relay locked-up through its lower winding. An alarm relay operating at this time in any of the other substations transmits a pulse to its gas tube, causing it to ionize. However, because of the operated condition of the B relay at the other substations, such as the B(16) relay at the far-end substation, current from the gas tube flows through the resistor 1601 instead of through the upper winding of the OP(15) relay. Since it is only necessary to store the information in the gas tube and not to operate the OP(15) relay at this time, the tube current is reduced to a low value by the resistor 1601. Relay Z(18) is operated to hold any alarm relay which may operate on a momentary ground by make-contact 8 of the B(16) relay. When the circuits restore to normal after the alarms at the other substation have been identified, relay B(16) releases, thereby operating the OP(15) relay through its secondary winding. The operation of the OP(15) relay at the far-end substation then causes the main station to again transmit the series of scanning pulses.

The far-end substation shown in Figs. 15 through 20 differs from the intermediate substations typified by the first substation in certain details. Firstly, the band-elimination network is omitted and secondly, the tone-reverting path through the bandpass filter 1504 on leads 1521 and 1522 is normally closed. Leads 1521 and 1522 connect to the telephone bridging network 1507 by way of leads 1519 and 1520, contacts 4 and 5 of the OP(15) relay, and leads 1516 and 1517. Therefore, upon the occurrence of an alarm at the far-end substation the OP(15) relay operates to open the tone-reverting path rather than to block the tone by the use of a band-elimination filter. Operation of the P(15) relay to close the reverting path by way of leads 1521, 1522, 1523 and 1524 is the same as at the first substation, however. The far-end substation is represented for purpose of illustration as a station having only nine alarms, and therefore the ADD-9 relay and its operating path by way of relays E(16) and STA(16) is omitted. The transmission or not of the third scanning digit is automatically controlled at the main station as hereinafter explained. All designators at the far-end substation are numbered to correspond to those at the first substation but with the first two digits keyed to the appropriate figure number so that circuit operation at the far-end substation may be followed with the same facility from the above description as at the first substation.

*Receiving alarm from substation*

When an alarm arises at a substation, as previously mentioned, the substation signals the main station by removing 2600-cycle signaling tone from the line incoming to the main station. At this time no information is given about the station's identity and the nature of the alarm. It is the purpose of the sending director circuit at the main station to recognize the removal of the signaling tone from the line and to act automatically to determine the substation in trouble and the nature of the trouble. This is accomplished by transmitting a first series of dial pulses for station identification and then transmitting a second series of dial pulses for individual alarm identification.

Figure 3:
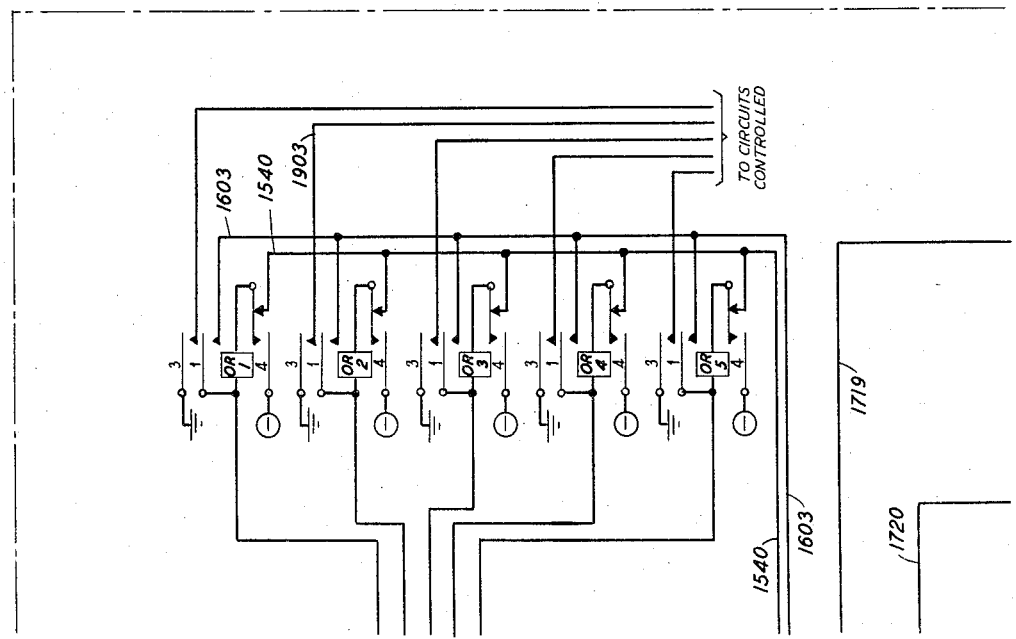

The main station relay circuits are shown in Figs. 4 through 8 and may be best arranged as in the applicable portion of Fig. 3 to obtain an overall picture. The main station includes an inband signaling transmitter 703, an inband signaling receiver 704, and a 2600-cycle oscillator 702, which are here shown in block diagrammatic form inasmuch as they are of the type described in detail in the aforementioned Fritschi et al. patent. The inband signaling transmitter 703 under the control of the pulsing lead M keys 2600-cycle oscillator 702 to the outgoing line 710. The inband signaling receiver 704 responds to tone on the incoming line 711 by holding ground off lead E. Besides the control relays, the main station also includes two banks A-1(5) and A-2(5) of a ten-position selector switch by means of which connection is made during the first series of scanning pulses to the individual station relays in Fig. 5, and during the second series of scanning pulses to the individual alarm relays in Fig. 4. A plurality of station keys (Figs. 5 and 6), one for each substation, are provided for signaling directly a desired substation. There are also provided a plurality of order keys (Figs. 4 and 5), which are used to control specific preassigned operations at the particular substation called in by the operation of one of the station keys.

In the alarm receiving operation the circuits function specifically as indicated in the following detailed description. When the 2500-cycle signaling tone is removed from the incoming line 711 by an alarm condition arising at a substation, the signaling receiver 704 recognizes this absence of tone and applies a ground connection to lead E. Lead E is connected to the operating winding of the line relay A(6), which is already directly connected to negative battery, by way of the middle contacts of the Line Open key 617, lead 618, break-contact 8 of the non-operated release relay RLS(6) and lead 619. The operation of the A relay (a) by way of its break-contact 2 and lead 659 opens the ground circuit to the delay relay DL(6); (b) removes battery from its own break-contact 8; (c) removes ground from its own contact 6 and prepares to apply battery to the pulsing lead 658; and (d) by way of its make-contact 4 closes a circuit to the Line Open lamp in Fig. 8 by way of lead 634, break-contact 9 of the keying relay KE(7) and lead 630. Relay DL(6), which is slow-releasing, is included in the circuit to prevent operation of the pulse generator due to a line transient which may cause spurious operation of relay A(6). The lighting of the Line Open lamp in Fig. 8 serves to indicate that the 2600-cycle signaling tone is not being received.

The eventual release of the DL(6) relay (a) releases relay B(7) by way of its front contact 6 and lead 637; (b) connects negative battery through lamp 608 in Fig. 6, resistor 609, its own back contact 7 and lead 660 by way of make-contact 6 of the A(6) relay to the pulsing lead 658; and (c) also applies ground by way of its back contact 5 to the lock-up path of the start relay ST(6) by way of lead 657 and back contact 7 of the stop relay SP(6). The application of negative battery to the lead 658 is conducted by way of back contact 8 of relay E(7), lead 641, back contact 2 of the pulsing relay P(7) and the M lead to the inband signaling transmitter 703, where the 2600-cycle oscillator 702 is disconnected from the outgoing line 710. The removal of 2600-cycle signaling tone from the outgoing line 710 causes all substations to go off-normal and to prepare for the reception of scanning digits. This is known as the off-hook or seizure period.

The removal of ground from the operating winding of the B(7) relay by way of lead 637 allows the normally operated B relay to release slowly and causes the following operations: (a) operates the E(6) relay by connecting ground thereto over its back contact 5 and lead 640; (b) allows the normally operated relay C(7) to release by the removal of ground from its front contact 6; and (c) closes its back contact 7 to extend the lead 540 from the operating winding of the stop relay SP(6) by way of the contact 6 of the H(5) relay, lead 527 and lead 636 to contact 8 on the A(6) relay for the purpose of stopping the pulse generator when the reverted station identification pulse is received. Negative battery from contact 8 of the A(6) relay is also extended by way of contact 7 of the B(7) relay over leads 527 and 425 to all station and alarm relays in Figs. 5 and 4, respectively.

The operation of the E(6) relay opens pulsing leads 658 and 641 through its contact 8 to relays A(6) and DL(6) and connects the lead 641 to negative battery through the lamp 608. The relay E(6) operated also operates relay F(7) by connecting ground through its own make-contact 4 to leads 639 and 725, the On contacts of the selector switch in Fig. 7 and the lead 720 to its operating winding. The operation of the F(7) relay in turn causes the operation of the G(7) relay over its front contact 4 to ground. The F(7) and G(7) relays are slow-releasing to delay the selector switch restoral at the end of each pulse train. Finally, the operation of relay E(6) operates the ST(6) relay from its grounded contact 4 over lead 639, contact 8 of the slow-releasing C(7) relay, leads 643 and 533, contact 5 of the SP(6) relay and lead 656. Relay S1(5) is also operated by the E(6) relay by ground on its contact 6, leads 638 and 528, and contact 8 of the non-operated H(5) relay, for the purpose of preparing the pulse generator for the transmission of the alarm scanning digit. The F(7) and G(7) relays are held operated during the pulsing interval but release during the interdigital period. The operated ST(6) relay locks over its make-contact 4, break-contact 7 of the SP(6) relay and lead 657 to the back contact 5 of the released DL(6) relay. The operation of the ST(6) relay functions to start the pulse generator as will be described later.

Meanwhile, relay C(7) has released and in so doing has operated the T1(8) relay over its grounded contact 5 and leads 716. The operation of the T1(8) relay in turn operates the T2(8) relay over lead 811 and its own contact 4. Further, the T2(8) relay operates the T3(8) relay by way of its contact 4 and lead 807. The operation of the T3(8) relay lights the Guard lamp in Fig. 8 over its grounded contact 4 and lead 808. The relays T1, T2 and T3 provide time delay to insure the closing of the 2600-cycle tone loop through the substation at the end of the complete scanning operation before the A(6) relay is connected to the signaling lead M. The lighting of the Guard lamp in Fig. 8 serves to indicate that a scanning operation is in progress.

The pulse generator itself comprises the PG(6), P(7), ST(6) and SP(6) relays. Before the ST(6) relay is operated, the PG(6) relay is operated to its front contact by way of a ground connection at break-contact 6 of the unoperated P(7) relay, lead 650, the lower winding of the PG relay and resistors 612 and 613 to negative battery. At this time the current through the lower winding is in the left-to-right direction to maintain the PG(6) relay operated. Capacitor 611 in series with the upper winding of the PG(6) relay and negative battery becomes charged to about 35 volts through resistor 613. Upon the operation of the ST(6) relay, which functions to start the pulse generator, its make-contact 10 is closed and thereby negative battery is applied through resistors 614 and 615 and lead 655 to the junction of the upper and lower operating windings of the PG(6) relay. The operation of the ST(6) relay has no immediate effect upon the PG(6) relay until the P(7) relay operates. The operation of the P(7) relay is determined by the delay time of the slow-releasing C(7) relay for the purpose of providing a timed tone-off interval which conditions the substations for the reception of pulsing. The eventual operation of the P(7) relay opens the ground connection on lead 650 to the PG(6) relay and applies ground through the make portion of contact 6 over lead 649 to the junction of resistors 612 and 613. This causes a steady state component of current through the lower winding of the PG(6) relay in series with resistors 612, 614 and 615 in a right-to-left direction which tends to release the PG(6) relay. However, the condenser 611 immediately discharges through the upper and lower windings and resistor 613 in series in a left-to-right direction tending to keep the relay operated. The current due to the discharge of capacitor 611 soon drops to a value which is less than the steady state current flowing from the negative battery, and at this time the PG(6) relay releases. The release of the PG(6) relay releases the P(7) relay. In the meantime the condenser 611 has become charged from negative battery in the opposite direction. The release of the P(7) relay again applies ground over lead 650 to the junction of the upper and lower windings of the PG relay, causing current to flow in the lower winding in a left-to-right direction which tends to operate the relay. However, the discharge current from the capacitor 611 now flows through the PG(6) relay windings in a right-to-left direction which tends to keep the relay released. Again the effect of the steady state current eventually becomes greater and the PG(6) relay operates, and in turn operates the P(7) relay. This on and off operation continues until the holding path of the ST(6) relay through contact 7 of the SP(6) relay is broken when pulsing has been completed. On each operation of the P(7) relay the pulsing lead M is closed to ground on make-contact 2, which keys the 2600-cycle oscillator 702 through the signaling transmitter 703 to the outgoing line 710. The charge and discharge time of the capacitor 611 determines the pulsing speed, which is nominally eight pulses per second.

In order to realize a pulsing speed of at least eight pulses per second, the pulse reverted is made to be one pulse behind the pulse that steps the substation selector switch to the position at which it identifies itself or at which the alarm condition has occurred. There are certain time delays built into the inband signaling receivers and associated relay circuits to guard against false operation by voice and noise simulated tone. For example, when the first pulse of a digit arrives at the signaling receiver, about 70 milliseconds are required for the operation of the P relay at the substation. Therefore, the pulse would have to persist much longer than 70 milliseconds were a portion of it to revert to the main station by way of the P relay contacts. This stretching of the pulses to enable the reverted pulse to return to the main station before the transmission of the succeeding pulse would restrict the pulsing speed to approximately three pulses per second. Since an operating speed of eight or more pulses per second is advantageous, a preparatory pulse technique is used. The first pulse in every digit is thus used to operate the P relay (if it is to be operated) and the succeeding pulse reverts to the main station without delay. Furthermore, the second pulse also functions as a preparatory pulse for the third pulse. In this way the reverted second pulse arrives at the main station at approximately the same time as the third pulse arrives at the substation.

The operation of the P(7) relay, besides transmitting 2600-cycle dial pulse tones over the line to the substations, also steps the selector switch at the main station. However, since the selector switch at the main station is arranged to be stepped one pulse behind the selector switches at the substations, the reverted pulses will be registered at the proper level on the main station selector switch. For this purpose a pulse absorber circuit comprising the relays X(8) and W(8) is provided. The first operation of the P(7) relay which transmits the first pulse of a scanning digit to the substations also by way of its make-contact 1 applies ground over a path including the lead 646, make-contact 10 of the E(6) relay, lead 644, back contact of the W(8) relay and lead 814 to the operating winding of the X(8) relay. The operation of the X(8) relay closes a circuit to ground through its front contact by way of leads 717 and 813 and the make-contact 8 of the F(7) relay to the right-hand side of the W(8) relay. The W(8) relay is not operated at this time, however, because ground is applied to both ends of its operating winding. The release of the P(7) relay at the end of the first pulse permits the W(8) relay to operate in series with the X(8) relay by removing ground from the left-hand side of the W(8) relay. The operation of the W(8) relay closes the lead 644 through its front contact to lead 719, which in turn is connected to the selector switch operating magnet ROT(7). The second operation of the P(7) relay therefore applies ground over the path just traced to the operating magnet ROT(7) of the selector switch causing it to step to position 1. Subsequent operations of the P(7) relay step the selector switch to successive positions on the contact banks A-1(5) and A-2(5). Coincident with the stepping of the selector switch to the first position the ON(7) contacts are operated to prepare a path to the release magnet RLS when the G(7) relay releases. When the pulsing has progressed to the point where the selector switch at the substation in trouble has reached the position at which its P relay is connected, the reverting path to the main station is closed. Consequently the next pulse of the digit is reverted to the main station and causes the signaling receiver 704 at the main station to remove ground from the signaling lead E and thereby to release the A(6) relay.

Figure 5:
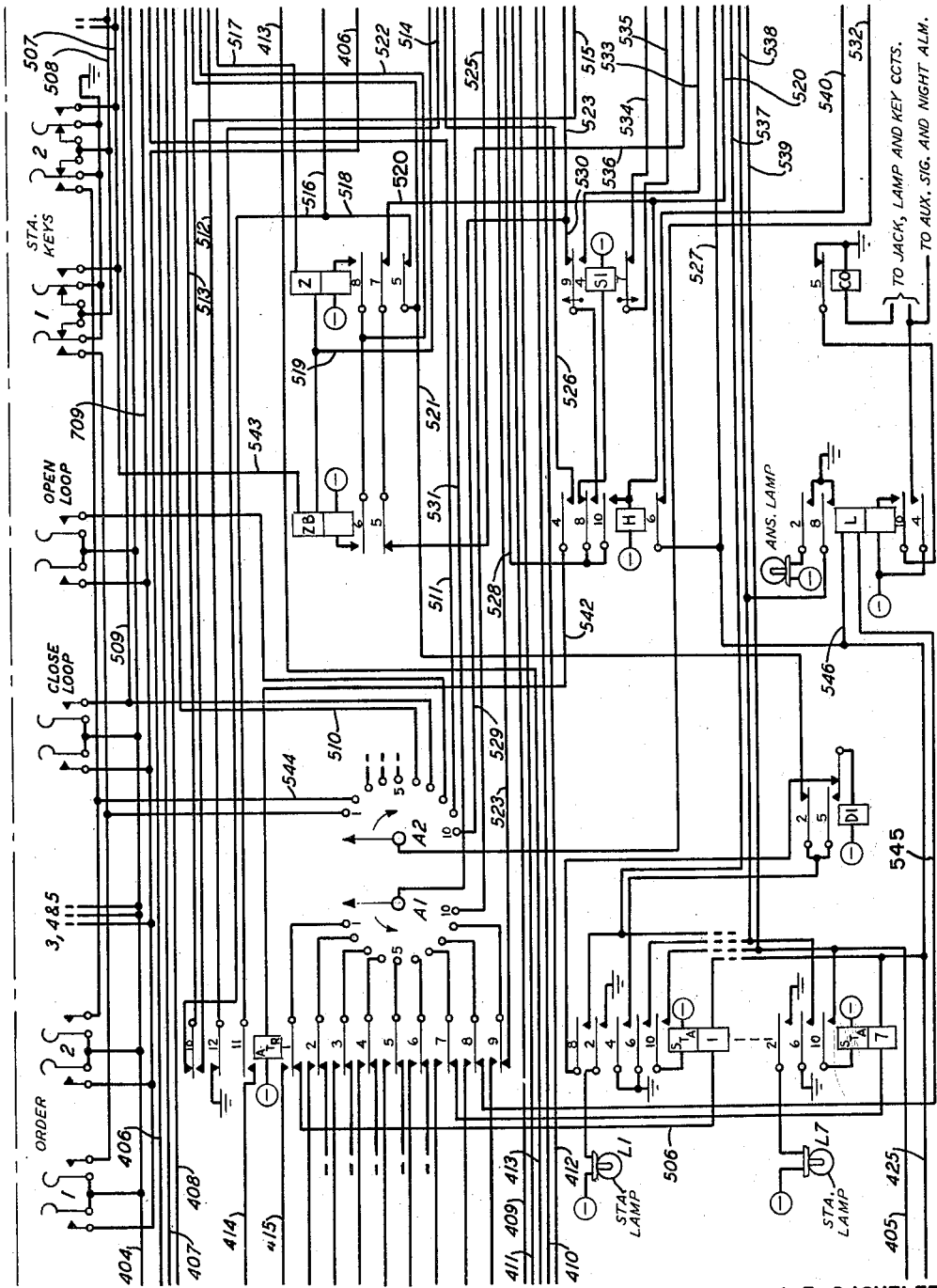

The main station is provided with a plurality of station relays, STA-1 through STA-7, each having associated therewith a station lamp L1 through L7, as shown in Fig. 5. The operating windings of the STA(5) relays are connected to individual positions on the A-1(5) bank of the selector switch through the break-contacts of the transfer relay ATR(5). The opposite ends of the operating windings of the STA(5) relays are connected in parallel by way of leads 425 and 527, make-contact 7 of the B(7) relay and lead 636 to the contact 8 on the A(6) relay, which is connected to negative battery. The brush of the A-1(5) bank of the selector switch is connected to ground by way of the lead 531, contact 7 of the KE(7) relay and lead 623 to ground on the right-hand contacts of the Line Open key.

Because of the above-mentioned connections the release of the A(6) relay upon reception of the reverted pulse applies battery to all the station relays, but ground is connected to that station relay corresponding to the position of the brush on the selector switch. The STA relay operated locks itself up by way of its own contact 10 to the Release key in Fig. 4 over lead 405, and at the same time lights its associated station lamp by way of ground on its contact 2. The operation of the STA relay further closes an operating path for the H(5) relay by applying ground on its own contact 6 by way of the lead 538, contact 7 of the released C(7) relay, contact 9 of the released G(7) relay, which is at this time operated, lead 525, contact 5 of the ZB(5) relay, contact 7 of the Z(5) relay, and lead 520 to the operating winding of the H(5) relay.

The release of the A(6) relay also applies battery by way of its contact 8 and leads 636 and 527 through the back contact 6 of the H(5) relay and lead 540 to the upper winding of the SP(6) relay. The upper winding of the SP(6) relay is also connected to ground over the lead 651 at the back contact 4 of the P(7) relay. The operation of the SP(6) relay as previously mentioned opens up the lock-up path to the ST(6) relay by way of its contact 7, and thereby stops the operation of the pulse generator.

During the on and off operation of the P(7) relay ground is repeatedly applied by way of the make portion of contact 4 of the P(7) relay over lead 646, contact 10 of the E(6) relay, lead 644, front contact of the W(8) relay, and leads 719, 723 and 720 through the operated ON(7) contact of the selector switch to the operating winding of the F(7) relay. Since the F(7) relay is a slow-release relay, it is held continuously operated by the pulses from the P(7) relay over the pulsing period. Upon the final release of the P(7) relay, operating ground for the F(7) relay disappears, allowing the latter relay to release. The release of the F(7) relay releases the X(8) and W(8) relays, and after an interval the G(7) relay also. The release of the G(7) relay applies ground on its back contact 7 over leads 722 and 721 by way of the operated ON(7) contacts of the selector switch to the RLS(7) magnet. The operation of the RLS(7) magnet restores the selector switch and its ON(7) contacts to normal. The release of the G(7) relay also closes the operating path to ground by means of its back contact 9 for the H(5) relay, which path has been previously traced. Upon restoral of the selector switch to normal, the F(7) and G(7) relays immediately reoperate from ground on contact 4 of the E(6) relay, leads 639 and 723, lower ON(7) contact and lead 720.

Relay H(5) in operating locks itself up under the control of the E(6) relay by way of its own contact 10, leads 528 and 638, and contact 6 to ground on the operated E(6) relay. Relay H(5) also operates the transfer relay ATR(5) over lead 542, contact 4 of the H(5) relay, lead 526 and grounded contact 7 of the ZA(6) relay. The operation of the H(5) relay further operates the ST(6) relay through its own make-contact 8 and contact 4 of the previously operated S1(5) relay, and after a time delay releases the S1 relay. The operation of the ATR(5) relay transfers the contacts of the A-1(5) bank of the selector switch from the operating windings of the STA(5) relays to the operating windings of the first nine alarm relays AL-1 through AL-9 in Fig. 4, and also connects the operating winding of the release relay RLS(6) to the tenth position of the A-1(5) bank of the selector switch over lead 536, contact 9 of the released S2(6) relay, leads 535 and 513, make-contact 10 of the ATR relay, lead 515 and back contact 7 of the S2(6) relay. The operation of the ST(6) relay starts the operation of the pulse generator as previously described to transmit the second alarm scanning digit to the substations.

As the alarm scanning pulses are transmitted to the substation the selector switch at the alarmed substation only rotates and allows a pulse to be reverted to the main station for each alarm condition. The reverted pulses are received at the main station by the inband signaling receiver 704, causing relay A(6) to function once for each alarm condition in the manner previously described in connection with the receipt of station identification pulses. As the main station selector switch is being stepped one position behind the selector switch at the substation, the alarm relays are successively grounded by the selector switch in proper relation to the pre-assigned numbered alarms at the substation. Each time relay A(6) releases, battery is applied to a group of alarm relays from its contact 8 causing one only to operate. In this manner, any combination of all or some of the alarm relays may be operated. Each alarm relay has associated with it an identifying alarm lamp L1 through L9 shown in Fig. 4. If, for example, alarm relay AL-1(4) operates from level one of the A-1(5) selector switch bank and lead 415, ground is applied by way of its contact 2 and lead 401 to the corresponding alarm lamp L1. The operated alarm relay AL-1 also locks itself up by way of its own make-contact 10 and common lead 416 under the control of the grounded Release key in Fig. 4. The lighted lamps then indicate the alarm conditions at the substation. Contacts 6 on all alarm relays connect to a common lead 417 to an audible minor alarm circuit. It is, of course, conceivable that the alarm relays be connected to separate audible alarms of a different character if desired, for example, to distinguish major alarms which might require dispatching a maintenance man to the alarmed substation from minor alarms for which automatic provision is made to cut in standby alternate equipment.

When position 10 of the selector switch is reached, the SP(6) and RLS(6) relays operate from the A-2(5) and A-1(5) banks, respectively, and restore the circuit to normal. The SP(6) relay is connected to the rotor of the A-2(5) bank of the selector switch by way of lead 532 and is connected to battery by way of lead 652 at the back contact 12 of the P(7) relay when it releases. Contact 10 of the A-2(5) bank of the selector switch is connected to ground by way of leads 529 and 530, back contact 9 of the S1(5) relay, which has released, the front contact 8 of the operated H(5) relay, lead 528 and thence to ground on the front contact 10 of the operated G(7) relay. The RLS(6) relay is operated from contact 10 of the A-1(5) bank of the selector switch, whose brush is at this time connected to ground over lead 531, contact 7 of the KE(7) relay and lead 623 to the Line Open key in Fig. 6, which is non-operated. The path to the operating winding of the RLS(6) relay from position 10 of the A-1(5) bank of the selector switch has previously been described.

Figure 8:
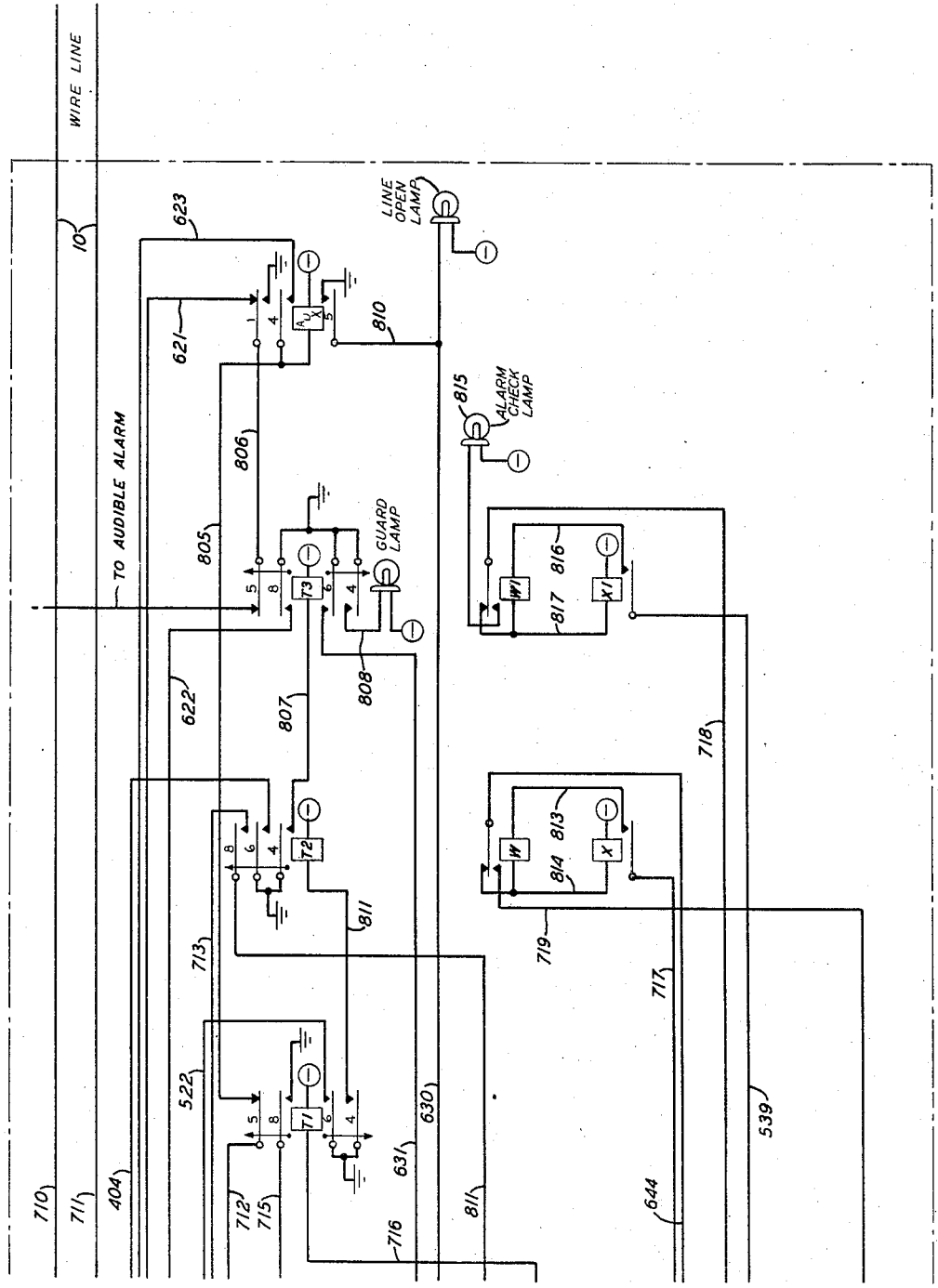

The operation of the SP(6) relay stops the pulse generator as in the station identification scanning phase previously described. The operated RLS(6) relay locks over its own contact 4 and lead 631 to ground on contact 6 of the operated T3(8) relay. The RLS(6) relay by opening its contact 8 releases the A(6) relay and thereby supplies operating ground for the DL(6) relay by way of its contact 10. The operation of the DL(6) relay operates the B(7) relay which in turn operates the C(7) relay and also releases the E(6) relay. The release of the E(6) relay releases the H(5), SP(6) and ATR(5) relays. The operation of the C(7) relay releases the three time-delay relays T1(8), T2(8) and T3(8), which in turn unlocks the RLS(6) relay. Relays F(7), G(7), X(8) and W(8) have also been released following the last operation of the P(7) relay. The release of the G(7) relay has restored the selector switch to normal as before. The release of the RLS(6) relay has reconnected the signaling lead E to the A(6) relay to restore the circuit to a condition for responding to tone-blocking by the substations. The release of the E(6) relay also reconnects ground at contact 6 of the A(6) relay to the pulsing lead M, causing the inband signaling transmitter 703 to restore a steady state 2600-cycle tone to the line 710 outgoing to the substations. The purpose of the time delay introduced at the main station by the relays T1(8), T2(8) and T3(8) is to insure the closing of the 2600-cycle tone loop through the substations before the A(6) relay is connected to the signaling lead E. The Guard lamp in Fig. 8 is also extinguished to indicate that a complete scanning cycle has been accomplished.

Figure 4:
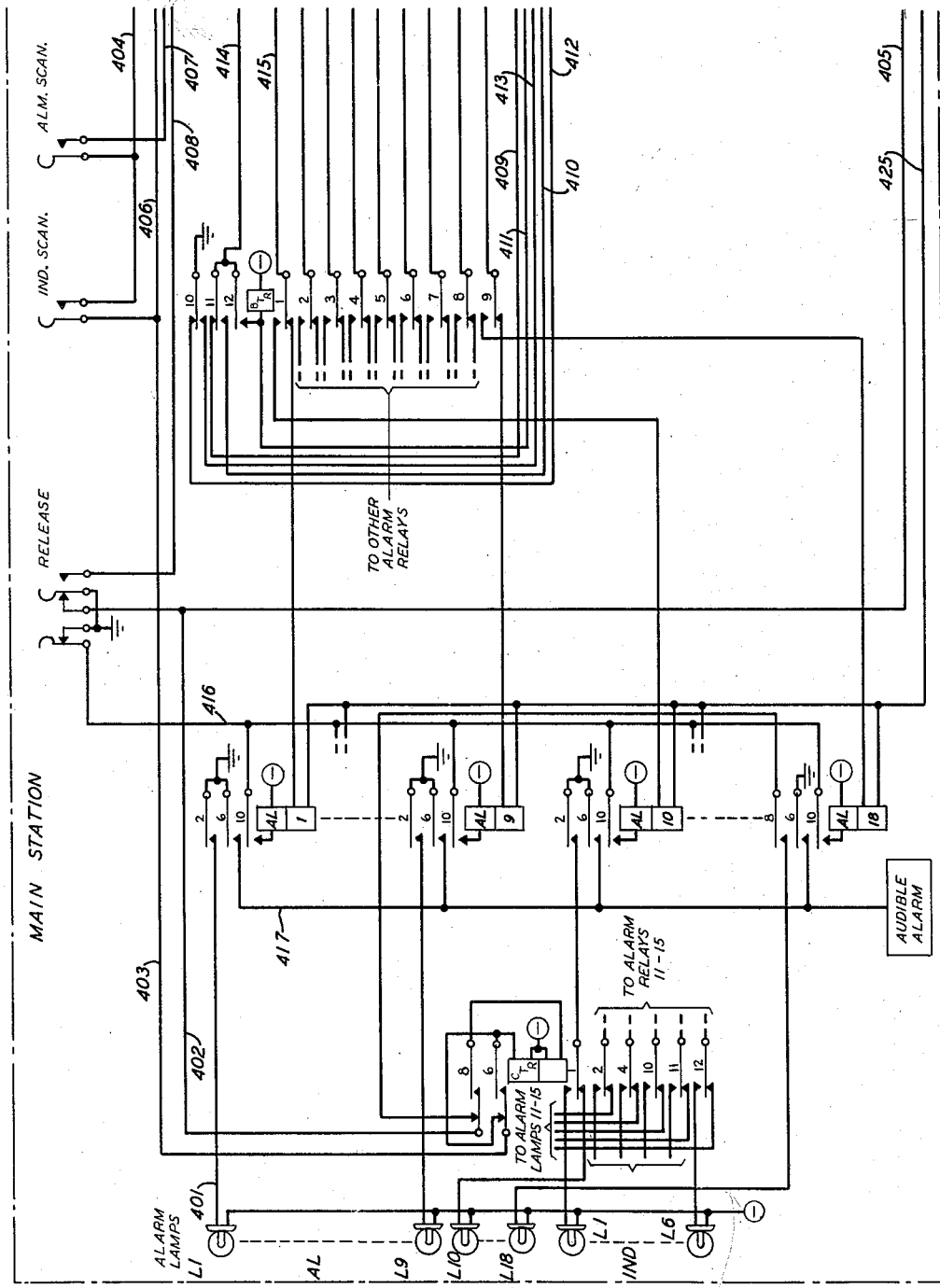

The alarm and station relays and their associated indicator lamps remain operated under control of the Release key in Fig. 4 and may be released after observing and recording them by opening this key.

The operation to the main station just described constitutes the cycle of operations for scanning the alarms at a substation having nine or fewer alarms. In order to scan a substation equipped with up to 18 alarms, a third scanning digit is transmitted by the main station.

There is associated with the STA relay corresponding to each substation at which there exist more than nine alarms an additional relay such as D1(5) associated with STA-1 in Fig. 5. Upon the operation of the STA-1(5) relay during the station identification scan, the relay S2(6) is operated from ground on contact 4 of the STA-1(5) relay through contact 2 of the nonoperated D1(5) relay, lead 521, contact 5 of the Z(5) relay, leads 518 and 516, contact 11 of the operated ATR(5) relay, lead 414, contact 11 of the released BTR(4) relay, and lead 409. The operation of the S2(6) relay prepares a circuit for the transmission of a second alarm scanning digit.

When the selector switch reaches position 10 on the bank A-1(5) for the first alarm scan, the RLS(6) relay cannot operate because of the operated S2(6) relay. However, transfer relay BTR(4) will operate from the S2(6) relay over lead 411, contact 8 of the S2(6) relay, lead 515, contact 10 of the operated ATR(5) relay, leads 513 and 535, contact 7 of the released S1(5) relay, lead 534, contact 2 of the S2(6) relay, lead 635, contact 5 of the released G(7) relay, lead 720, ON(7) contact, and leads 725 and 639 to ground on contact 4 of the operated E(6) relay. The BTR(4) relay operated locks on its own contact 12 by way of lead 414, contact 11 of the operated ATR(5) relay, leads 516 and 518, contact 5 of the Z(5) relay, lead 521, contact 2 of the D1(5) relay and contact 4 of STA(4) relay to ground. Ground over substantially the same path just traced operates the ST(6) relay by way of the contact 6 on the S2(6) relay and leads 643, 533 and 656 and contact 5 of the SP(6) relay. This again starts the operation of the pulse generator as previously described.

The operation of the BTR(4) relay transfers the leads from the A-1(5) bank of the selector switch through the contacts of the operated ATR(5) relay to the second group of nine alarm relays AL-10 to AL-18 in Fig. 4. Each of the alarm relays AL-10 to AL-18 has associated with it an individual alarm lamp (L10 to L18 shown in Fig. 4). The S2(6) relay is released slowly after the BTR(4) relay has operated.

When the selector switch reaches position 10, the SP(6) and RLS(6) relays are operated and the circuit restores to normal as previously described for the single alarm scan condition with one difference. When relay B(7) operates at the end of the second alarm scan the relay D1(5) will operate from ground on contact 4 of the B(7) relay by way of lead 537 and contact 8 of the STA-1(4) relay. The D1(5) relay locks on the grounded contact 4 of the STA-1(5) relay by way of its own contact 5. The operation of the D1(5) relay then releases the BTR(4) relay.

At the end of a complete automatic alarm scan the station and alarm relays and their associated indicating lamps are held operated under the control of the Release key in Fig. 4 as previously mentioned. In preparation for the next alarm scan the Release key must be operated after the Guard lamp in Fig. 8 extinguishes. In the event that the Release key is not operated before the next alarm scan occurs, the Alarm Check lamp in Fig. 8 is caused to light and remain on under the control of the X1(8) and W1(8) relays to indicate that a prior set of alarm indications has not been cleared. The X1(8) relay is operated from ground on contacts 6 of the STA(5) relays when the C(7) relay is operated at the end of a complete scan by way of lead 817, back contact of the W1(8) relay, lead 718, contact 6 of the operated C(7) relay and lead 538 to contact 6 of the STA-1(5) relay. The X1(8) relay operated places ground on the right-hand side of the operating winding of the W1(8) relay by way of lead 816, front contact of the X1(8) relay and leads 539 and 405 to the Release key. This leaves relay W1(8) short-circuited until the C(7) relay is released at the beginning of a subsequent alarm scan. At this time the W1(8) relay operates in series with the X1(8) relay and lights the Alarm Check lamp. If on a second alarm scan the Alarm Check lamp is found to be operated, it will be necessary to start a manual alarm scan to determine the true state of the second set of alarms.

*Transmitting an order*

Figure 6:
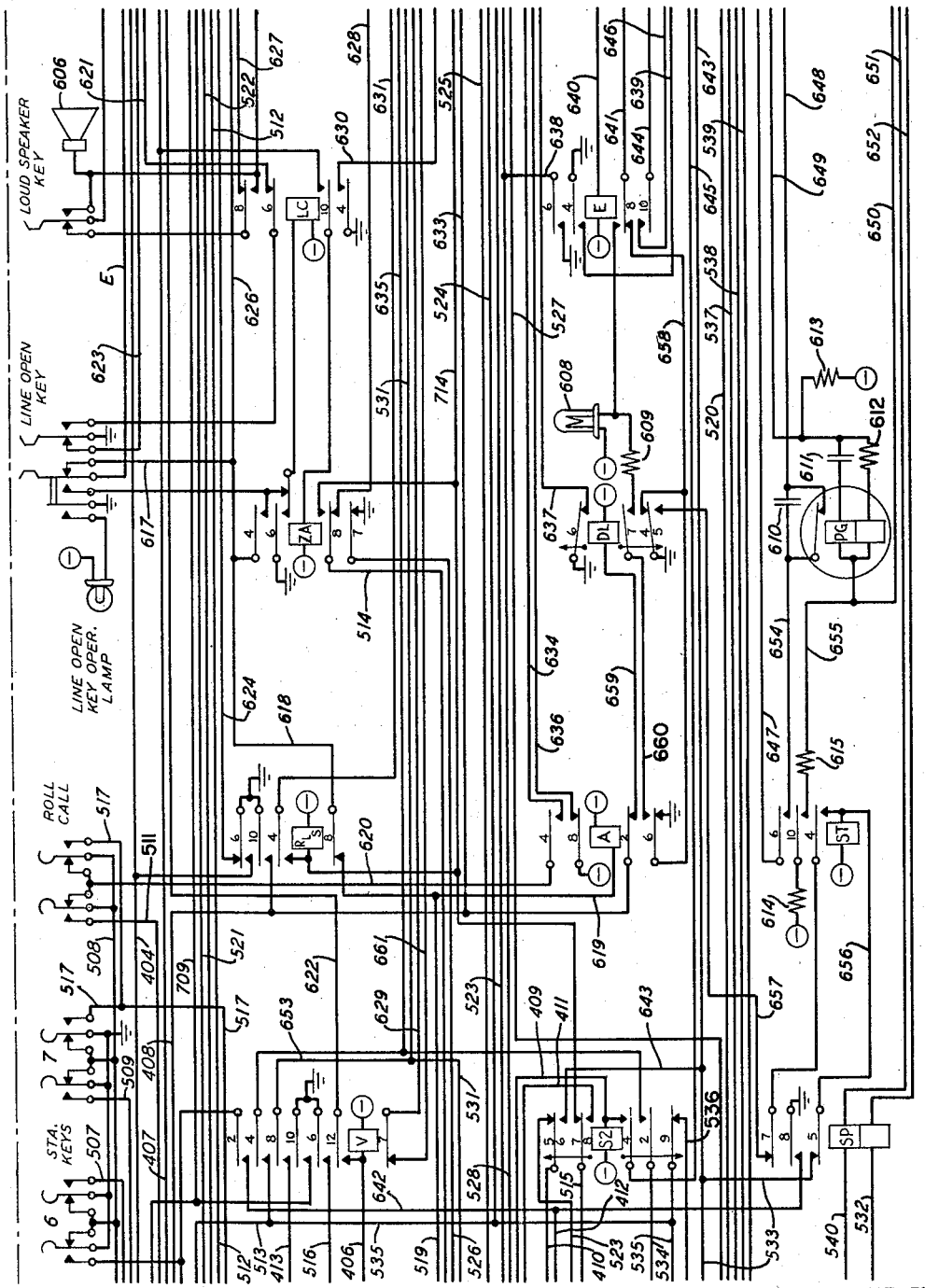

The main station is provided with a plurality of station keys shown in Figs. 5 and 6, one for each substation controlled from the main station. There are also provided a plurality of order keys of the general type, for example, Order 1 and Order 2, shown in Fig. 5, and of the specific type such as the Close Loop and Open Loop keys. There are also provided, as shown in Fig. 4, an Indication Scan key and an Alarm Scan key. There is further provided a Roll Call key in Fig. 6. The Order 1 through Order 5 keys are assigned to control circuits external to the alarm system, such as for starting the emergency engine-alternator and for resetting the transmitter power monitor sensitrol relays. The other specific orders relate to the operation of the alarm system itself.

In order to send an order the operation of two keys is required. The operation of the first key is associated with gaining access to the desired substation, and the second key is associated with a particular order function.

The operation of gaining access to a substation is performed by operating one of the station keys and holding it operated until the red Guard lamp in Fig. 8 operates. Let it be assumed that it is desired to gain access to the second substation. In this case, the Station Key 2 is operated and held. Since the second substation has more than nine alarms, pressing Station Key 2 applies ground over lead 543 to the ZB(5) relay in series with the A(6)

relay by way of leads 519 and 619, and also applies ground by way of lead 544 to the second position of the bank A–2(5) of the selector switch. The operation of the ZB(5) relay opens the operating path for the H(5) relay to prevent the automatic transmission of either of the alarm scanning digits.

The operation of the A(6) relay releases the slow-release DL(5) relay. Battery is then applied to the in-band signaling transmitter 703 by way of the signaling lead M to remove 2600-cycle signaling tone from the alarm circuit to cause the substations to prepare to receive pulses. The release of the DL(5) relay releases the B(7) relay, which in turn operates the E(5) relay. The operation of the E(5) relay operates the ST(6) and F(7) relays and starts the operation of the pulse generator in the manner previously described in more detail in the previous section. The pulse generator causes the transmission of scanning pulses to the substation, thereby stepping all selector switches over their terminal banks.

It will be recalled from the discussion under "Alarm Originates at Substation" that the station relays are connected to unique positions on the selector switches at each substation and that the P relay, which controls the operation of the reverting path, is connected one position below that of the station relay. Thus, the P relay at the first substation is connected to the first position of the selector switch and the STA relay is the second position; at the second substation the P relay is connected to the second position of the selector switch and the STA relay at the third position thereof; and so forth. Therefore, in gaining access to the second substation, as is assumed in our example, on the third pulse from the main station the substation selector switch will have been advanced to its third position to which its station relay is connected, while the main station selector switch will have been advanced to the second position at which ground is connected by way of the Station Key 2. Ground on the second position of the A–2(5) bank of the main station selector switch is applied by way of lead 532 to the SP(6) relay, thereby stopping the operation of the pulse generator. The stopping of the pulse generator also causes the release of the F(7) relay, which in turn releases the G(7) relay, operates the selector switch RLS(7) magnet, and restores the selector switch to normal. At the same time the C(7) relay is released, causing the operation of the timing relays T1(8), T2(8) and T3(8). The operation of the T3(8) relay lights the red Guard lamp as an indication that the process of transmitting an order is yet to be completed by operating an order or a scan key. Station Key 2 may now be released. The holding of the station key during the process of gaining access to the substation has prevented the operation of the A(6) relay by any pulses which might be reverted to the main station by way of the closed loop at the far-end substation.

Substations 1 through 6 are assumed to be equipped for the reporting of more than nine alarms. Far-end substation 7 is assumed to be equipped for the reporting of fewer than nine alarms. The process of gaining access to a substation reporting fewer than nine alarms differs in one respect from that for gaining access to a substation reporting more than nine alarms. This difference lies in the connection of the Station Key 7, for example, to the A(6) relay by way of the lead 517 through the Z(5) relay rather than through the ZB(5) relay. The Z(5) relay includes an additional contact 5 not found on the ZB(5) relay for the purpose of opening the operating path to the BTR(4) relay in addition to that for the H(5) relay.

In either case, the substation to which access has been gained operates its station relay while all other stations operate their lockout relays substantially as described above for station identification in the automatic alarm scan. Therefore, when an order or scan key is operated at the main station to transmit an order thereto, only the substation to which access has been gained will follow the dial pulsing.

To transmit an order to be executed by one of the order relays at the substation one of the Order keys 1 through 5 at the main station is pressed. For example, if Order 2 key at the main station is operated, ground is supplied from contact 6 on the T2(8) relay by way of lead 404 and the Order 2 key, first to the second position of the A–2(5) bank of the selector switch by way of lead 544, and then to the KE(7) relay by way of lead 709. The operation of the KE(7) relay now operates the H(5) relay by way of its grounded contact 8 and lead 520, and removes ground from the rotor of the A–1(5) bank of the selector switch by the opening of its contact 7 to prevent any alarm lamps from lighting, and further prepares an operating path for the RLS(6) relay through its contact 6. The operation of relay H(5) operates the ATR(5) relay, locks itself under control of the E(6) relay, and starts the pulse generator by operating the ST(6) relay through the make-contact 4 of the S1(5) relay essentially as described for the automatic alarm scanning process.

The selector switch advances over the A–2(5) bank of contacts as pulsing proceeds until it locates ground on the position connected to the operated order key, and then operates the SP(6) relay to cause the pulse generator to stop. Once the pulse generator has stopped the F(7), G(7), T1(8), T2(8) and T3(8) relays operate as before to restore the main station circuits to normal.

At the substation the selector switch has also been advanced during the pulsing and comes to rest on a position which is connected to the appropriate order relay. It will be noted that the first order relay in Fig. 13 at the first substation, for example, is connected to the second position of the A–1(11) bank of the substation selector switch; the second order relay is connected to the third position of the selector switch; and so forth. Order relays OR–1 through OR–5 have a common connection over lead 940 to negative battery on contact 9 of the C(10) relay, which releases at the end of the digit, to one side of the operating windings of the order relays through their own contacts 4. There is a further common connection to ground over leads 1003 and 1004 to contact 4 of the B(10) relay, which holds operated over a complete scanning operation until steady tone is applied to the line, to lock-up contacts 1 of the order relays and the opposite side of the operating windings. Therefore, when the selector switch comes to rest on the third level of the A–1(11) bank of the selector switch, ground is connected over make-contact 3 of the operated TRANS(11) relay and lead 1112 to the left-hand side of the operating winding of the OR–2 relay and upon release of the C(10) relay at the end of the digit the relay is operated. The relay immediately locks up to battery on its make-contact 4 and to ground on its make-contact 1 and lead 1003. The OR–2 relay operates to place a ground on lead 1303 from its operated contact 3 to a particular circuit to be controlled. The particular circuit under control is not shown in the drawing. The remaining order relays are similarly operated from other levels of the A–1(11) bank of the selector switch to operate other individually controlled circuits. At the completion of the call steady tone is returned to the line from the main station to release the A(10), B(10), TRANS(11) and order relays and restore all circuits to normal.

Figure 7:
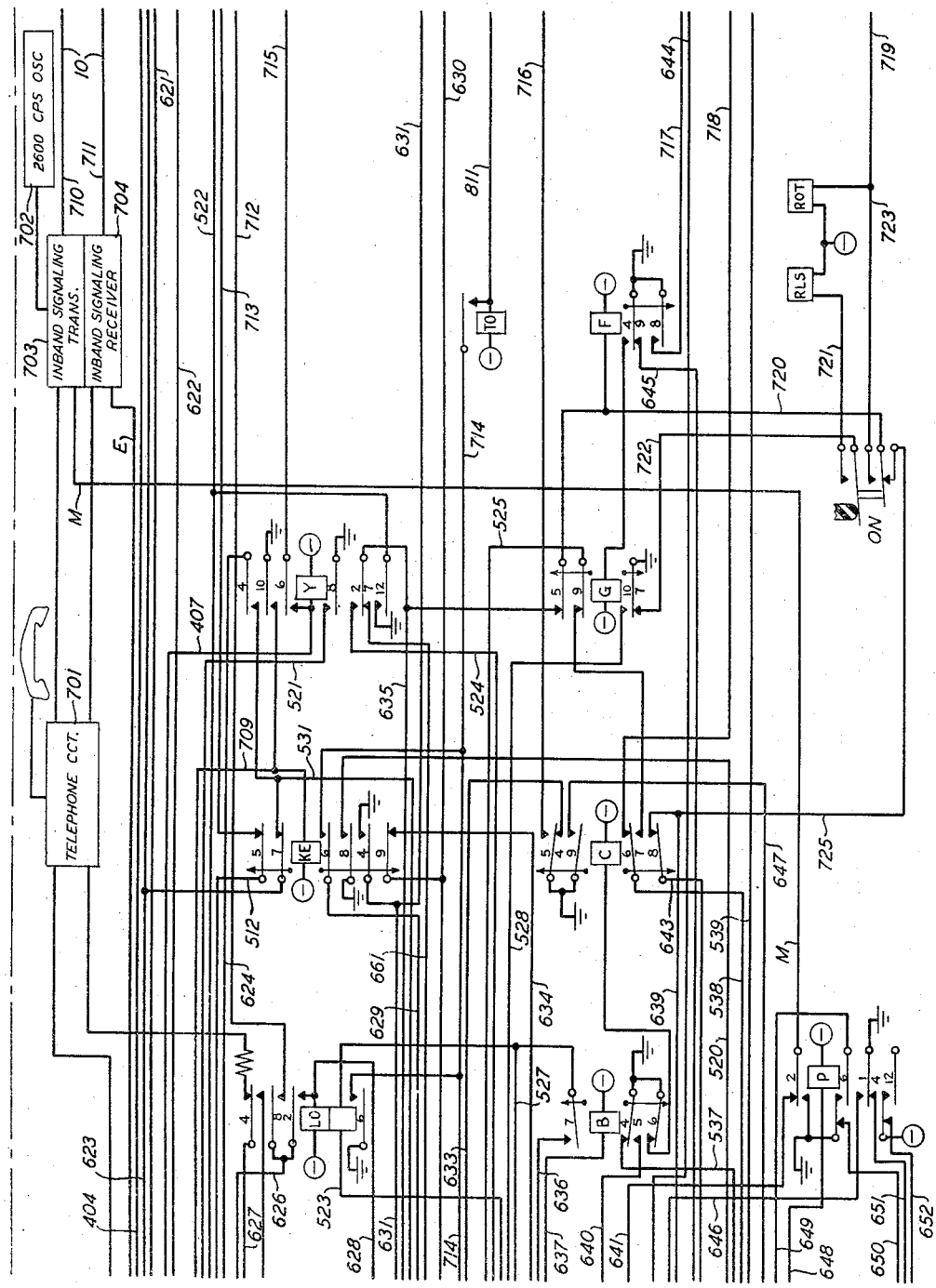

A further protective feature is incorporated in the main station relay circuits. In the event that the 2600-cycle signaling tone is also being used as a pilot frequency, it is important that the steady note is not removed from the line for too long a period lest pilot monitoring circuits at the substations be caused to send a spurious alarm. The tone may inadvertently be held off the transmission loop for too long a period in the interval between calling in a substation and transmitting an order. For this purpose a thermal time-out relay TO shown in Fig. 7 is included. This relay may be set to operate in say five to ten seconds and the pilot monitoring circuits may correspondingly be designed to ignore absences of tone of this duration. An operating path for the TO(7) relay may be traced from ground on contact 12 of the non-operated ATR(5) relay, lead 512, contact 5 of the non-operated relay KE(7), lead 713, contact 8 of the T2(8) relay, and lead 811. This path is closed as soon as the T2(8) relay operates on sending the station calling digit. In automatic scanning the operating path for the TO(7) relay would have opened upon operation of the ATR(5) relay before the time delay had expired. At the end of the predetermined time delay the TO(7) relay operates and extends the same ground that caused its operation over its single contact and lead 714 to the RLS(6) relay to return tone to the line and restore all circuits to normal. In this event the operator would be required to recall the substation before transmitting the desired order. Accordingly, whether or not the signaling tone is serving additionally as a pilot tone the time-out relay TO insures return of the tone to the line promptly and precludes manual control from inadvertently maintaining the alarm circuits in an inoperative condition for an extended period of time.

*Manual alarm scan*

If a manual alarm scan were desired to check the status of alarms at a particular substation, for example, for the reason that it was observed that the Alarm Check lamp in Fig. 8 had been lit as a result of a prior automatic alarm scan, the following sequence of operations would be pursued. First, access is gained to the desired substation by pressing the appropriate station key and holding it until the red Guard lamp lights, as previously described for transmitting an order; secondly, the Alarm Scan key in Fig. 4 is operated instead of an order key and is held operated until the red Guard lamp goes out. The operation of the Alarm Scan key applies ground from lead 404 by way of its contacts and lead 407 to cause operation of the Y(7) relay. The operation of the Y(7) relay operates the KE(7) relay from ground on its contact 10 and at the same time applies ground on back contact 6 of the RLS(6) relay by way of lead 624, its own make-contact 4 and lead 531 to the brush of the A-1(5) bank of the selector switch for the purpose of enabling the associated alarm relays. Relay Y(7) also locks itself through its own contact 6 to ground on contact 8 of the T1(8) relay by way of lead 715 and further operates the relay S2(6) for those substations equipped to transmit more than nine alarms. If the desired substation had fewer than nine alarms, the relay Z(5) would have been operated to prevent the operation of the S2(6) relay. It will be noted that the Z(5) or ZB(5) relays lock themselves up by way of lead 522 on the grounded make-contact 12 on the Y(7) relay.

In either case, the operation of the KE(7) relay operates the H(5) relay, which in turn operates the ATR(5) and ST(6) relays to start the operation of the pulse generator and to connect the A-1(5) bank of the selector switch to the alarm relay windings. When an alarm exists at the particular substation, the line relay A(6) will operate when pulses are reverted as in an automatic alarm scan to connect battery to an alarm relay. The alarm relay will operate and light an associated alarm lamp. When the selector switch reaches position 10 on the eleventh pulse of the alarm scanning digit, the SP(6) relay will operate to stop the pulse generator and will also operate the RLS(6) relay, which functions to normalize the circuit and extinguish the red Guard lamp.

If the substation being scanned had required the reporting of more than nine alarms, the second alarm scanning digit would have been generated automatically by the renewed operation of the ST(6) relay by way of the operated S2(6) relay.

*Indication scan*

Provision is made in the alarm system of this invention for scanning six additional conditions at a substation, here called indications, which do not transmit an automatic alarm signal to the main station. These indications may relate to the condition of up to six diversity switch units controlling alternate transmission paths through a substation, for example, or to circuits controlled by the operation of the order relays. These indications may be scanned manually by an operation which is similar to that of a manual alarm scan.

In order to initiate an indication scan, access must first be gained to a particular substation by operating and holding one of the station keys until the Guard lamp in Fig. 8 lights. At this time ground is supplied to the Indication Scan key in Fig. 4 over lead 404 from the contact 6 of the operated T2(8) relay. Operating the Indication Scan key connects ground by way of lead 406 to the operating winding of the V(6) relay and also by way of lead 403 to the upper winding of the transfer relay CTR(4). In operating, the V(6) relay locks itself up by way of its own contact 12 and lead 622 to ground on contact 8 of the T3(8) relay. The operation of the V(6) relay also (a) operates the KE(7) relay on its grounded contact 10 by way of lead 709; (b) connects ground by way of its contact 2 from contact 10 of the BTR(4) relay by way of leads 642, 412 and 510 to the sixth position of the A-2(5) bank of the selector switch; and (c) prepares an operate path for the S2(6) relay by extending ground on its contact 6 by way of lead 516, contact 11 of the ATR(5) relay, lead 414, contact 11 of the BTR(4) relay and lead 409 to the operating winding of the S2(6) relay. However, the S2(6) relay is not operated until the ATR(5) relay operates to close its contact 11.

The KE(7) relay operates as in the manual alarm scan to actuate the ATR(5) and ST(6) relays. The operation of the ST(6) relay starts the pulse generator as before. During this scanning cycle the A-1(5) bank of the selector switch is rendered ineffective inasmuch as ground over lead 531 to the A-1 bank of the selector switch is removed by the open contact 10 on the BTR(4) relay. The selector switches at the particular substation involved in the scan and the selector switch at the main station moves one step for each pulse of the digit until the main station selector switch reaches position 6, at which time ground is extended over lead 532 to the upper winding of the SP(6) relay to stop the pulse generator. The inter-digital time measuring relays F(7) and G(7) release at this time thereby restoring the selector switch to normal and operating the BTR(4) relay.

At the substation the transfer TRANS(11) relay would have operated on the first digit to transfer the leads on the A-1(11) bank of the selector switch from the station relays to the order relays. At the end of the second digit the substation selector switch would have advanced to position 7 to which is connected the upper winding of the T(12) relay which transfers the leads from the A-2(12) bank of the selector switch from the alarm relays to the indication circuits. This means that on the transmission of the third digit to the substation the indication leads rather than the leads to the alarm relays will be scanned.

At the main station the CTR(4) relay has transferred the connections of the alarm relays AL-10 through AL-15 from the alarm lamps to the indication lamps L1 through L6 in Fig. 4. Also the BTR(4) relay has been operated over a path which may be traced from ground on make-contact 4 of the E(6) relay, leads 639 and 725, ON(7) contact, lead 720, back contact 5 of the released G(7) relay, lead 635, make-contact 4 of the V(6) relay, lead 513, make-contact 10 of the ATR(5) relay, lead 515, make-contact 8 of the S2(6) relay and lead 411 to the operating winding of the BTR(4) relay. The BTR(4)

relay immediately locks itself up on the grounded make-contact 6 of the V(6) relay by way of leads 516 and 414, make-contact 11 of the ATR(5) relay and its own make-contact 12. Before the slow-releasing S2(6) relay is able to release, ground is extended from the make-contact 6 of the V(6) relay to the operating winding of the ST(6) relay to start the pulse generator for the last scanning digit by way of lead 516, make-contact 11 of the ATR(5) relay, lead 414, make-contact 11 of the BTR(4) relay, lead 410, make-contact 6 of the S2(6) relay, leads 643 and 533 and the back contact 5 of the SP(6) relay. The operation of the BTR(4) relay further extends ground to the rotor of the A-1(5) bank of the selector switch from its make-contact 10 over lead 413, make-contact 8 of the V(6) relay, and leads 653 and 531, and also connects this bank of the selector switch to the alarm relays AL-10 through AL-18. However, only the alarm relays AL-10 through AL-15 will be connected to the indication lamps because of the operation of the CTR(4) relay. As previously described for an alarm scan, the A(6) relay will release momentarily on a reverted pulse from the substation for each indication. The release of the A(6) relay together with the commutation of the rotary switch A-1(5) causes the indicating lamps to give a visual indication of the condition of the indication circuits at the substation. When the selector switch reaches the tenth position, the RLS(6) relay operates and restores the circuit to normal as previously described. The release of the Indication Scan key releases the V(6), CTR(4), KE(7), and RLS(6) relays.

*Order to close loop at an intermediate substation*

In the event of a line failure in the alarm system of such magnitude as to open the tone loop at some point, the alarm system may be made to function on a contracted basis until the failure is corrected by transmitting an order from the main station to a substation on the near side of the failure to close the reverting path there. The operation of transmitting a close loop order to an intermediate substation is similar to that described above under the heading "Transmitting an Order."

As before, the first step in transmitting the order is that of gaining access to the desired substation. At the main station, therefore, the appropriate Station key is pressed and held operated until the red Guard lamp lights. It will be recalled from the previous discussion that when the selector switch at a substation reaches and stops at the position at which its station relay is connected, this relay will operate upon release of the C(10) relay at the end of the transmission of the station calling digit. The operation of the STA(10) relay, at the first substation, for instance, then operates the OP(9) relay by connecting ground on its contact 6 by way of lead 935. The reverting tone path is at this time opened by the operation of the 4 and 5 contacts of the OP(9) relay.

After the Guard lamp at the main station is lit, the Close Loop key in Fig. 4 is operated. Ground over lead 404 from contact 6 of the operated T2(8) relay is extended through the Close Loop key first to position 7 of the A-2(5) bank of the selector switch and then by way of lead 709 to the operating winding of the KE(7) relay. The operation of the KE(7) relay starts the pulse generator as previously described in connection with the operation of the order keys and transmits a series of eight pulses to the substation. Because of the ground connection at position 7 of the A-2(5) bank of the selector switch, the SP(6) relay is operated on the eighth pulse to stop the pulse generator.

At the substation following the station calling digit the TRANS(11) relay has operated from ground on the C(10) relay and has transferred the leads from the A-1(11) bank of the selector switch from the station relay to the order relays. At the first substation, for example, the close loop relay CL(9) is connected by way of lead 928 to the eighth position of the A-1 bank of the selector switch through make-contact 8 of the TRANS(11) relay. Therefore, when the substation selector switch reaches the eighth position on the eighth pulse of the order digit, ground is extended from contact 12 of the operated B(10) relay over lead 1005, the brush and position 8 of the A-1(5) bank of the selector switch, make-contact 8 of the TRANS(11) relay, and lead 928 to the operating winding of the CL(9) relay. The other end of the operating winding of the CL(9) relay is connected to negative battery over its own break-contact 4 and leads 926 and 940 by way of contact 9 of the C(10) relay which releases at the end of the order digit. The operated CL(9) relay locks itself up on its own contact 4 to battery and through its own contact 1 and lead 925 to ground on contact 10 of the non-operated open loop relay OL(11). The operation of the CL(9) relay also lights the line closed lamp LC in Fig. 9 and closes the tone reverting path through the bandpass filter network 911, leads 921 and 922, leads 919 and 920, contacts 4 and 5 of the OP(9) relay, leads 916 and 917, and its own contacts 2 and 3 to the telephone bridging network 907. The operated OP(9) relay, which temporarily holds the tone loop open, releases at the end of a call when steady tone is restored to the line at the main station, but the CL relay remains locked up on the non-operated OL(11) relay.

The release of the Close Loop key at the main station releases the KE(7) relay, and all circuits are restored to normal.

While the shortened tone loop is closed through an intermediate substation, the alarm and order wire signaling may be carried out from the main station on the shortened loop in exactly the same manner as previously done on the full loop when it was closed at the far-end substation.

After the line failure has cleared, the tone loop may again be opened at the intermediate substation by transmitting an open loop order. After station access has been gained, the Open Loop key in Fig. 5 is operated to connect ground to the A-2(5) bank of the selector switch on position 8 and to the KE(7) relay to start the transmission of a nine-pulse digit.

The operation at the substation is the same as for the close loop order, except that this time the substation selector stops at position 9 and operates the open loop relay OL(11) by way of lead 1122. The OL(11) relay operated locks itself up by way of its own contacts 9 and 12 to ground over leads 1003 and 1004 to the B(10) relay. The OL(11) relay also removes locking ground from the CL(9) relay and at the same time locks up the OP(9) relay by way of its grounded contact 10, thereby insuring the opening of the tone loop at the substation. At the end of the call the B(10) relay releases and opens up the circuits to the STA(10), OP(9) and OL(11) relays and all other circuits are restored to normal.

*Order to open loop at the far-end substation*

The alarm tone loop is normally closed at the far-end substation so that steady state 2600-cycle tone is returned to the main station in the idle condition to keep the in-band signaling receiver thereat operated. It is sometimes necessary to open the loop at the far-end substation, particularly in the event of a line open failure, when it becomes necessary to call the roll of the substations.

The order to open the loop at the far-end substation is transmitted in a manner similar to that in which a close loop order is transmitted to an intermediate substation. The far-end substation is first called in by operating the Station Key 7 at the main station. The operation of this key causes the main station to transmit a first digit consisting of eight pulses. On the eighth pulse the pulse generator at the main station is stopped and the Guard lamp is lit.

At the far-end substation the selector switch is stepped to its eighth position whereby its STA(16) relay is operated by way of the strapped connections to the A–1(17) bank of the selector switch. The operation of the STA(16) relay causes the operation of the OP(15) relay over lead 1535, which immediately opens the tone loop through the bandpass filter network 1511 on contacts 4 and 5 of the OP(15) relay.

At the main station the Open Loop key in Fig. 5 is now operated to place ground on the eighth position of the A–2(5) bank of the selector switch and also to operate the KE(7) relay, which starts the transmission of a second series of pulses.

At the far-end substation the open loop relay OL(17) has its operating winding connected by way of lead 1722 and the make-contact 9 of the operated TRANS(17) relay to the ninth position of the A–1(17) bank of the selector switch. When the selector switch reaches its ninth position the OL(17) relay is operated and locks itself up by way of its own contacts 9 and 12 and lead 1525 to the break-contact 5 on the CL(15) relay. The operation of the OL(17) relay is indicated by the lighting of the line open lamp LO in Fig. 17 on its contact 8. The operated OL(17) relay also furnishes locking ground by way of its contact 10 and lead 1527 to the OP(15) relay. The OP(15) relay, which previously had operated with the STA(16) relay at the end of the station calling digit, is now caused to hold the reverting path open through its contacts 4 and 5. At the end of the order digit all circuits at the main station and at the far-end substation are restored to normal except for the OL(17) and OP(15) relays. However, when tone is restored to the line, it will not be received at the main station. The latter station then automatically responds by scanning the stations and results in the sounding of an audible alarm as described in more detail in the next section.

A roll call may be made at this time as will be explained in detail later. However, when it is desired to close the loop at the far-end substation again, it is necessary to call in the substation and transmit a close loop order in the same manner as previously discussed in connection with intermediate substation operation. The close loop relay CL(15) at the far-end substation is connected by way of lead 1528 and the contacts of the TRANS(17) relay to the eighth position of the A–1(17) bank of the selector switch, the same as at an intermediate station. The operation of the CL(15) relay at the far-end substation, however, differs from that at an intermediate substation in that the operation of this relay at the far-end substation serves mainly to remove the locking ground on its contact 5 to the OL(17) relay. Once the OL(17) relay has been unlocked the far-end substation loop is closed as for the normal idle condition and all circuits are allowed to restore to normal.

*Line open reporting*

Whenever the transmission line in the outgoing or incoming paths is open due to a fault, 2600-cycle signaling tone cannot be returned to the inband signaling receiver at the main station. Provision is therefore made for sounding a major office alarm when this situation arises.

The absence of incoming signaling tone is recognized, as in the alarm reporting cases previously discussed, by the inband signaling receiver 704 at the main station, which responds by placing ground on signaling lead E. Ground on this lead operates the line relay A(6) which then acts to release the DL(6) relay, which in turn causes the removal of signaling tone from the outgoing line by removing ground from the pulsing lead M. The B(7) and C(7) relays are also released to control the timed tone-off interval which conditions the substations for the reception of tone pulsing. The timing relays T1(8), T2(8) and T3(8) also operate and the Guard lamp lights. The Line Open lamp in Fig. 8 also lights as an indication that 2600-cycle signaling tone is not being received at the main station.

The E(6), F(7), G(7) and ST(6) relays are caused to operate from the released B(6) relay thereby causing the pulse generator to generate a scanning digit. The S1(5) relay also is operated at this time and would ordinarily prepare a path for the transmission of a second scanning digit, but for the fact that the H(5) relay is unoperated. The operating path for the H(5) relay depends on the operation of one of the station relays, but inasmuch as no pulses are returned during a line open scan no station relay will operate. Each pulse of the scanning digit will cause the selector switches at all substations to step one position for each pulse, but at the main station, because of the absorption of the first pulse by the X(8) and W(8) relays, the selector switch there will operate one position behind the selector switches at the substations.

On the eleventh pulse from the main station pulse generator the main station selector switch will have reached the tenth position. At this position ground on the A–2(5) bank of the selector switch by way of lead 532 will cause the operation of the SP(6) relay, thereby stopping the operation of the pulse generator. At the same time the line open relay LO(7) will operate from the A–1(5) bank of the selector switch. The operating path for the LO(7) relay may be traced from ground on the right-hand contacts of the Line Open key in Fig. 6, lead 623, contact 7 of the non-operated KE(7) relay, lead 531, rotor of the A–1(5) selector bank, tenth position of the A–1(5) bank, lead 536, contact 9 of the non-operated S2(6) relay, leads 535, 513, contact 10 of the non-operated ATR(5) relay, lead 514, back contact 8 of the non-operated ZA(5) relay, and lead 628 to the upper winding of the LO(7) relay. The LO(7) relay immediately locks up on its own contact 2 by way of lead 626 to ground on the signaling lead E, and therefore will remain operated until incoming signaling tone is again received at the inband signaling receiver 704. There is a further locking path to ground to the right-hand section of the Line Open key in Fig. 6 which is closed on operation of the AUX(8) relay followed by release of the T1(8) relay, as mentioned in the next paragraph. This path extends over make-contact 8 of the LO(7) relay, lead 712, contact 5 of the T1(8) relay, lead 805, contact 4 of the AUX(8) relay, and lead 623.

The operation of the LO(7) relay (a) operates the RLS(6) relay from ground on its contact 6 and lead 714, and (b) prepares an operating path for the auxiliary relay AUX(8) from ground on the signaling lead E by way of its own contact 8, lead 712, contact 5 of the T1(8) relay, which at this time is in its operated condition and prevents the immediate closing of this operating path to the AUX(8) relay, and lead 805. The AUX(8) relay functions upon the subsequent operation of the T1(8) relay and the concurrent release of the T3(8) relay to provide a ground on its front contact 1 by way of lead 806 and contact 5 of the T3 relay to an audible major alarm circuit, not shown in the drawing.

By means of the stopping of the pulse generator and the operation of the RLS(6) relay, all relays except the LO(7), AUX(8) and RLS(6) relays are returned to their normal condition, and the Guard lamp in Fig. 8 is extinguished. Upon release of the T1(8) and T3(8) relays the AUX(8) relay operates to sound the above-mentioned audible alarm, which continues to sound until the Line Open key in Fig. 6 is operated.

The operation of the Line Open key opens both of the above-mentioned locking paths to the LO(7) relay, thereby releasing the AUX(8) relay to silence the alarm and at the same time operates the line closed relay LC(6) by way of front contact 6 on the ZA(5) relay. The Line Open key is a locking type key and remains operated until released. The Line Open Key Operated lamp in Fig. 6 remains lit while the Line Open key is in its locked position. The LC(6) relay operated furnishes a holding ground by way of its contact 4 and lead 630 for the Line Open lamp in Fig. 8.

When the line fault is finally cleared, tone will again be received on the incoming line, and the inband signaling receiver 704 will operate to remove ground from lead E and thereby release the LC(6) relay. The release of the LC(6) relay extinguishes the Line Open lamp and, by extending ground from the operated Line Open key by way of its own contact 6, lead 631, back contact 1 of the AUX(8) relay, lead 806, and back contact 5 of the T3(8) relay to the audible alarm circuit lead, again sounds the alarm. This second alarm is silenced by releasing the Line Open key.

If the line were opened and then closed momentarily before the selector switch has reached the tenth level, the circuit would function as described above except for the following differences. When the tone is removed from the line, even though due to a transient condition, the scanning operation will be started. If, however, while the selector switch is rotating, and the line restores to normal allowing the 2600-cycle tone to be received, the A(6) relay will release. This action will stop the pulse generator by way of the non-operated H(5) relay. If the selector switch has reached one of the first seven levels a station relay will operate, thereby operating the H(5) relay and a normal alarm scan of that station will result. If, on the other hand, the eighth position of the selector switch is reached, the L(5) relay will operate and light the Answer lamp in Fig. 5. This situation will be described in more detail below.

In the event that the selector switch has been advanced to the ninth level, the LO(7) relay will operate on its lower winding which connects by way of lead 527, contact 7 of the B(7) relay and lead 636 to battery on contact 8 of the operated A(6) relay. The LO(7) relay does not lock at this time but the RLS(6) relay operated thereby nevertheless operates to restore the circuits to normal.

*Roll call*

Provision is made in the alarm system of this invention for making a manual roll call of all the substations following a line open alarm, or if for any reason it is desired to check the internal operation of each substation or to determine the location of a line fault. If the alarm loop is closed at the far-end substation at the time a line open alarm is received, it is necessary to transmit an open loop order to the far-end substation preparatory to calling the roll. The transmission of an open loop order has already been discussed in detail. The completion of an open loop order results in an audible line open alarm, which is silenced as above mentioned by operating the Line Open key in Fig. 6.

The roll call is initiated by depressing the Roll Call key in Fig. 6 and holding it operated until the Guard lamp lights. The operation of the Roll Call key places ground from lead 508 on the ninth level of the A-2(5) bank of the selector switch by way of lead 511, thereby preparing the circuit for stopping the operation of the pulse generator on the tenth pulse of the roll call digit. The Roll Call key also places ground on the A(6) relay in series with the Z(5) relay over lead 517. The operation of the A(6) relay starts the operation of the pulse generator in the same manner as described for calling in a substation above. A ten-pulse digit is transmitted and the pulse generator stops when the main station selector switch reaches level 9.

At each of the substations there is provided an E relay connected at level 10 of the A-1 bank of the selector switch. At the first substation, for example, the E(10) relay is directly connected to the tenth position of the A-1(11) bank of the selector switch by way of lead 934. The operation of the E(10) relay connects the P(9) relay, which controls the closing of the pulse reverting path at each substation, to a specific level on the A-1(11) bank of the selector switch. At the first substation, for example, the P(9) relay is connected to the first level of the selector switch over a path which extends from the operating winding of the P(9) relay over lead 929, middle contacts of the Signal Main Station key in Fig. 11, leads 1106, 930, 1029, contact 5 of the STA(10) relay, lead 1018, front contact 1 of the E(10) relay, lead 1028 and contact 1 of the TRANS(11) relay. At the second substation the P relay is connected to the second level; at the third substation, to the third level; and so forth.

At the main station, the completion of the roll call digit has restored the selector switch to normal and has left the relay circuits of the sending director in the condition for the transmission of an alarm scan. To complete the roll call the Alarm Scan key in Fig. 4 is operated. The KE(7) and Y(7) relays operate as in a normal alarm scan, but because of the operated Line Open key in Fig. 6, which holds the LC(6) relay operated, the additional ZA(6) relay also operates. The operating winding of the ZA(6) relay is connected by way of contact 10 on the LC(6) relay to the lead 407 which extends to the Alarm Scan key. The operation of the ZA(6) relay (*a*) removes the ground connection on its contact 7 by way of lead 526 to the ATR(5) relay, thereby leaving the leads from the A-1(5) bank of the selector switch connected to the station relays rather than to the alarm relays; (*b*) holds the LC(6) relay operated on its contact 6; (*c*) connects the signaling lead E by way of its contact 4 to the A(6) relay; and (*d*) by way of its contact 8 connects the RLS(6) relay position 10 on the A-1(11) bank of the selector switch.

The first pulse of the scanning digit caused to be transmitted by the operation of the Alarm Scan key is absorbed at the main station and does not step the main station selector, but at the first substation the selector switch is stepped to the first level and operates the P(9) relay to revert the second pulse to the main station. The second pulse of the digit steps the selector switch at the main station to its first level and steps the selector switches at all the substations to the second level. At the first substation the second pulse is reverted to the main station. At the second substation the P relay is operated in preparation for reverting the third pulse of the digit to the main station.

At the main station the reverted second pulse causes the operation of the STA-1(5) relay, and lights the corresponding station lamp. The third pulse reverted from the second substation operates the STA-2(5) relay and its lamp. This process continues for all substations which are able to respond to the pulsing and which are not separated from the main station by a line fault. At the end of this scan all station lamps will be lit up to the point of the line fault, beyond which the lamps will be dark. Therefore, it can be assumed that the line open condition has occurred between the last substation whose lamp is lit and the next following substation.

The release of the Alarm Scan key releases the ZA(6), Y(7), RLS(6), KE(7) and H(5) relays and thereby restores all circuits to normal. The operation of the Release key in Fig. 4 releases the station relays and extinguishes those station lamps which were lit during the roll call scan.

*Reporting substation equipment failure*

Provision is made in the alarm system of this invention for the reporting of the failure of alarm system equipment at a substation such as component failure in the inband signalling receiver, a loss of the —48-volt or +130-volt battery supply. This is a self-alarming feature of the alarm system. Such a failure manifests itself at the main station by a ten-second interruption of the alarm tone loop, which is recognized at the main station by a line open scan, as previously described.

Figure 9:
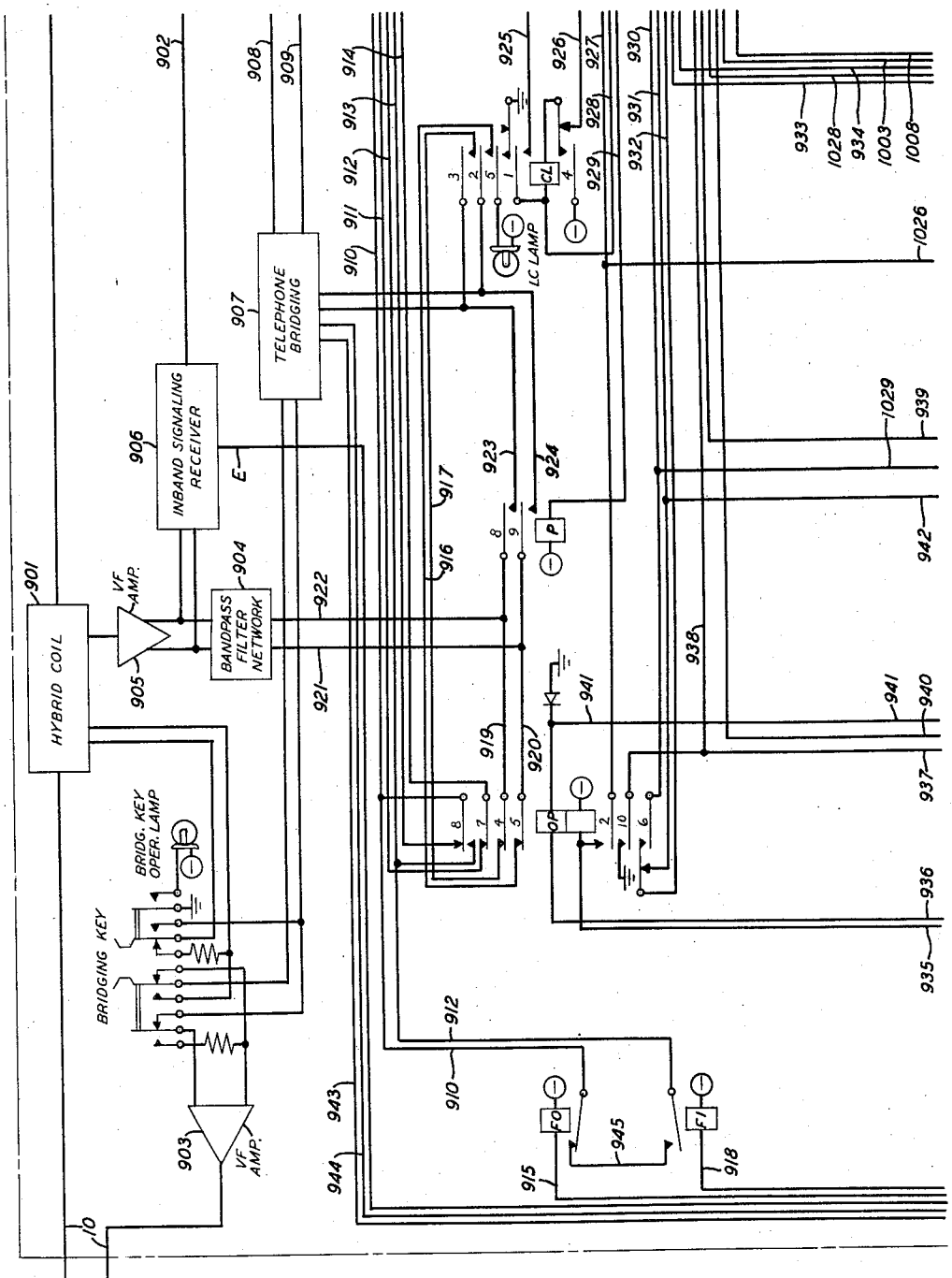
Figure 10:
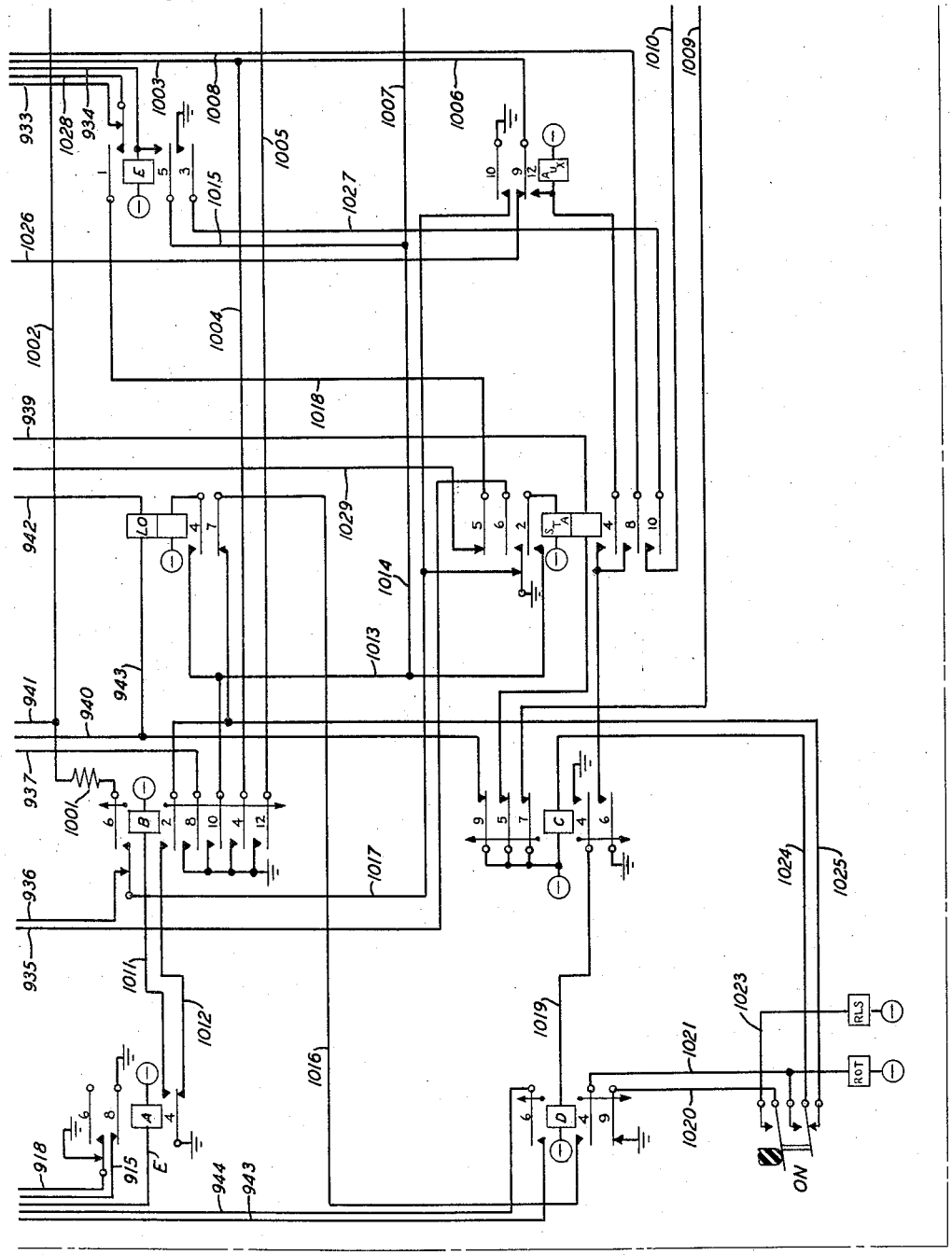
Figure 11:
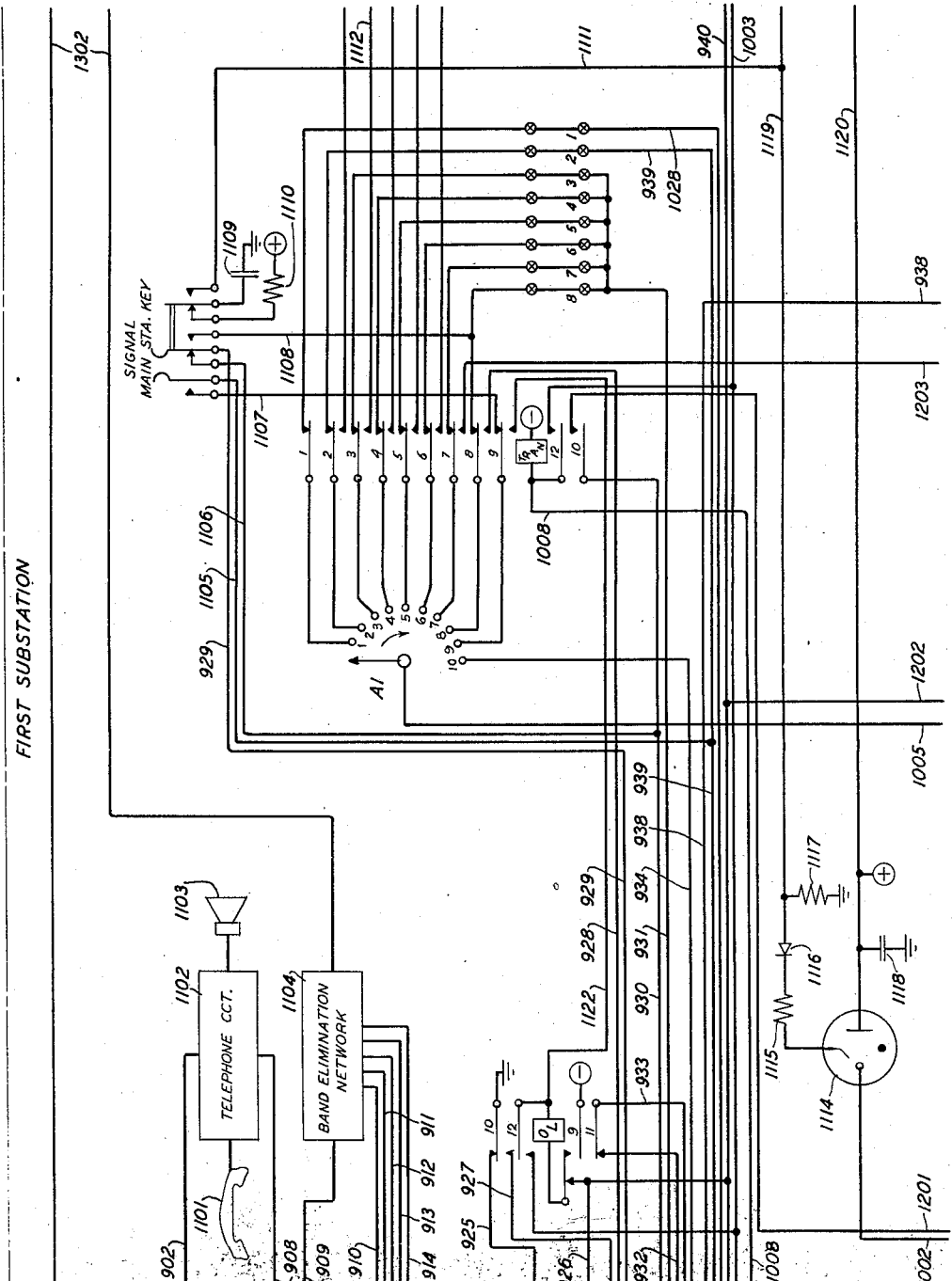
Figure 13:
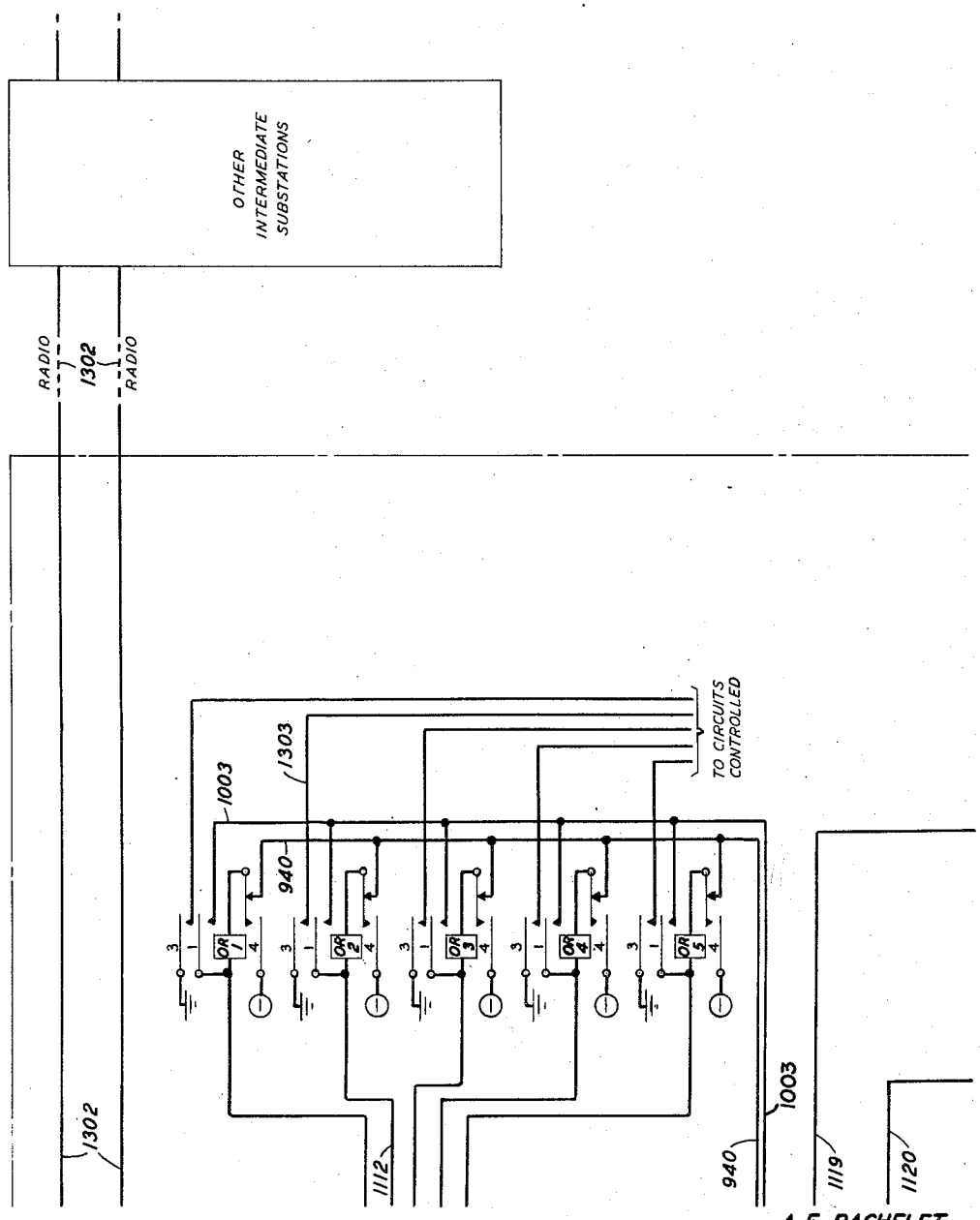
Figure 15:
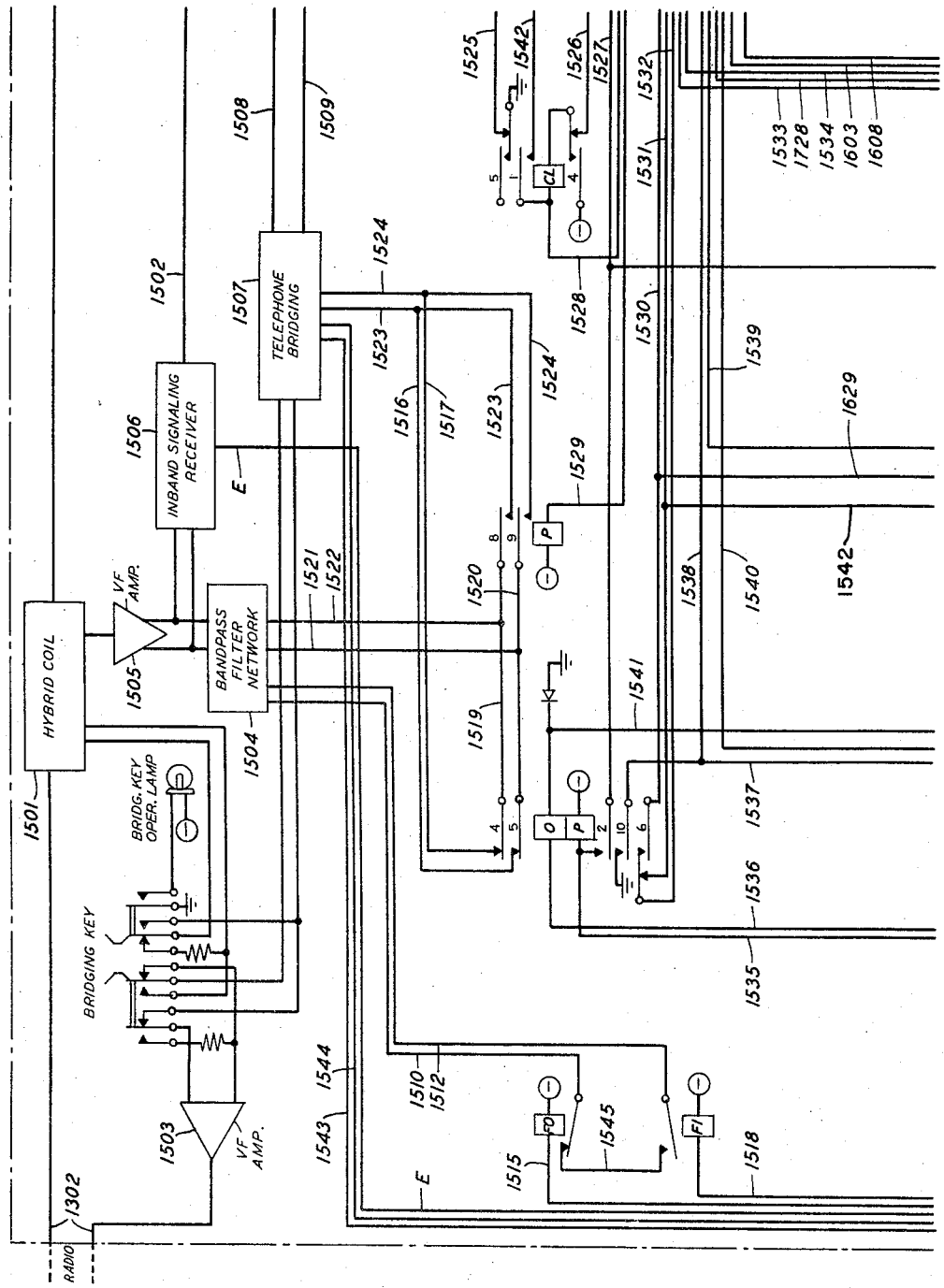
Figure 16:
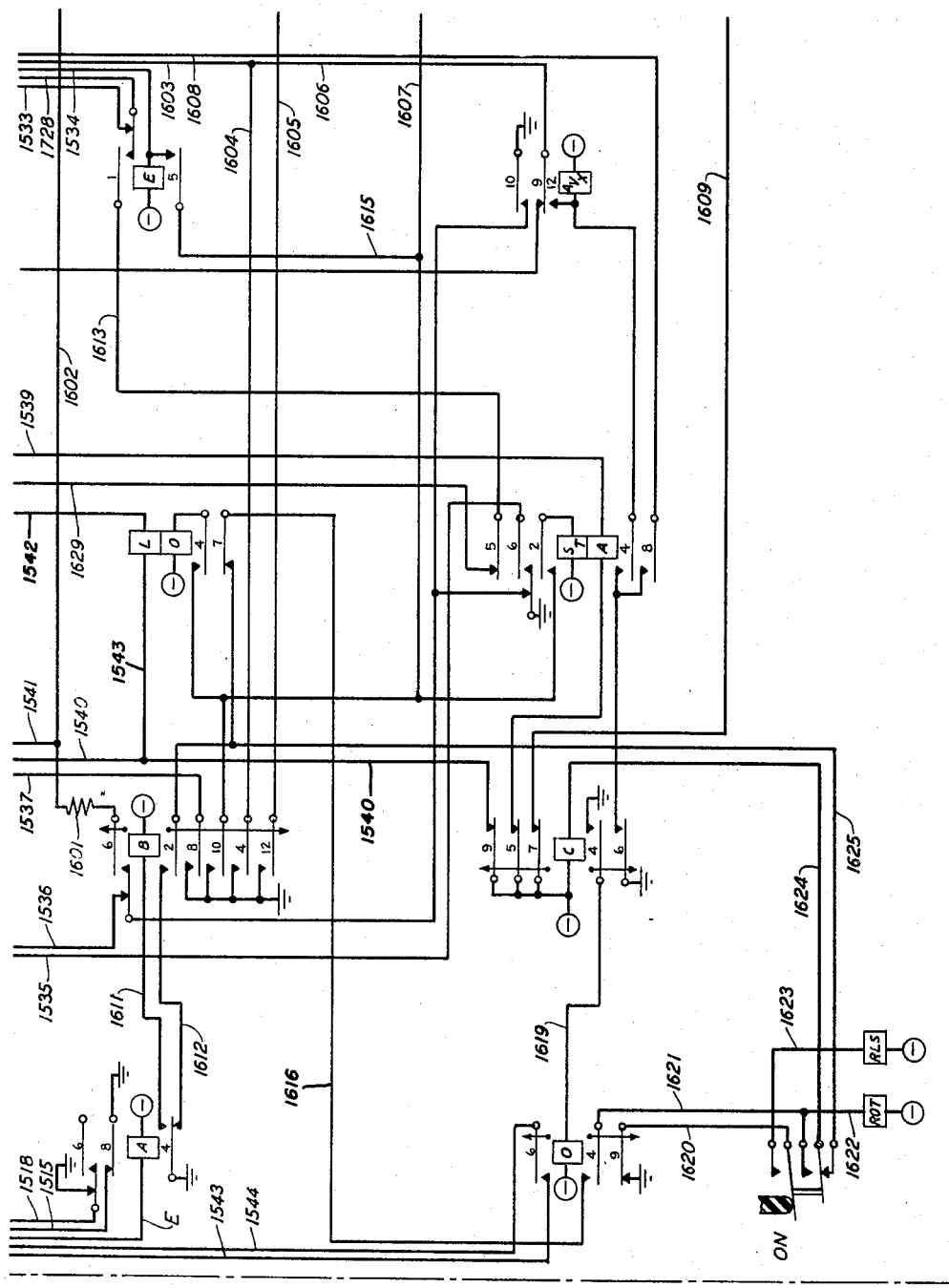
Figure 17:
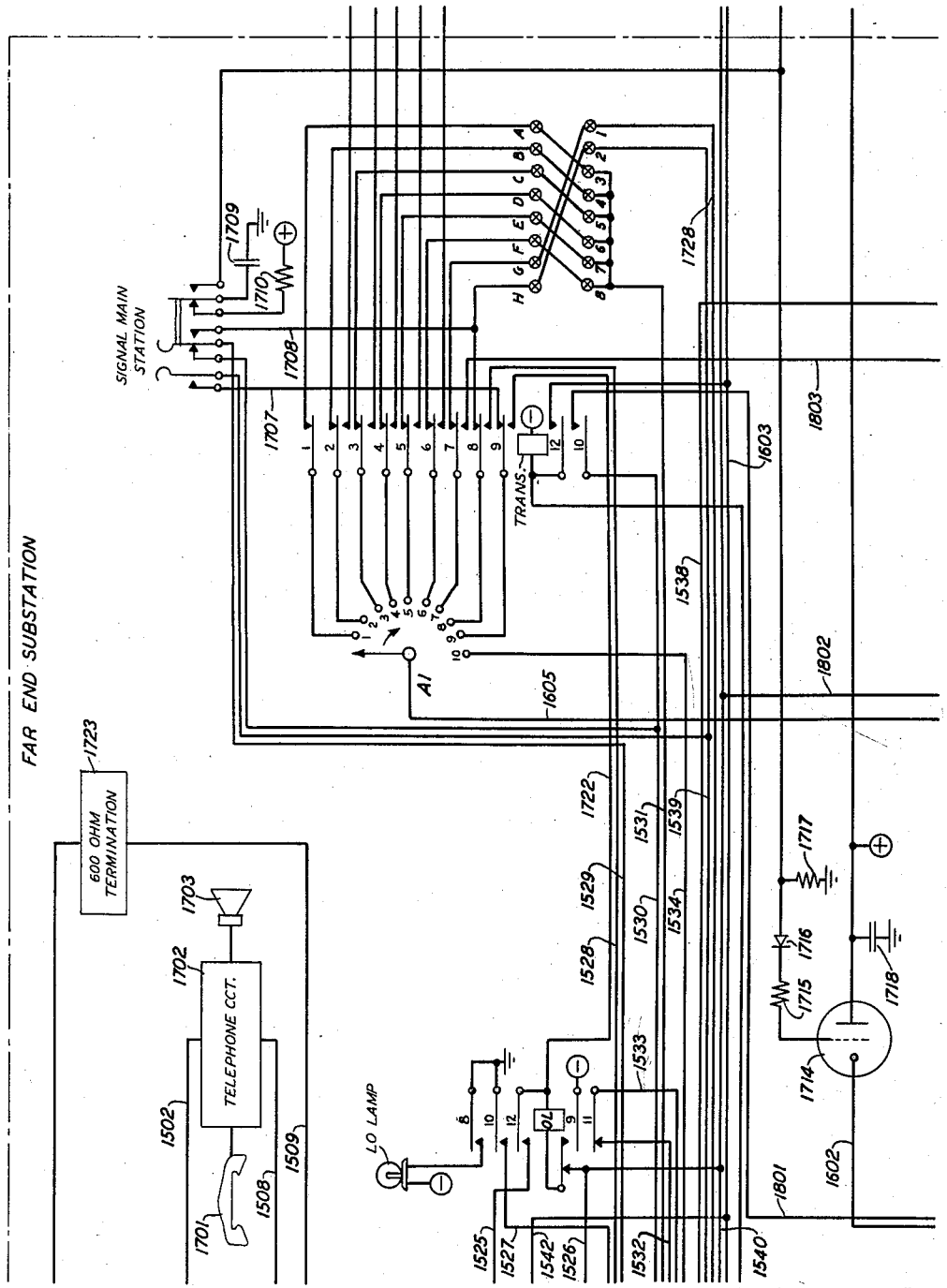
Figure 18:
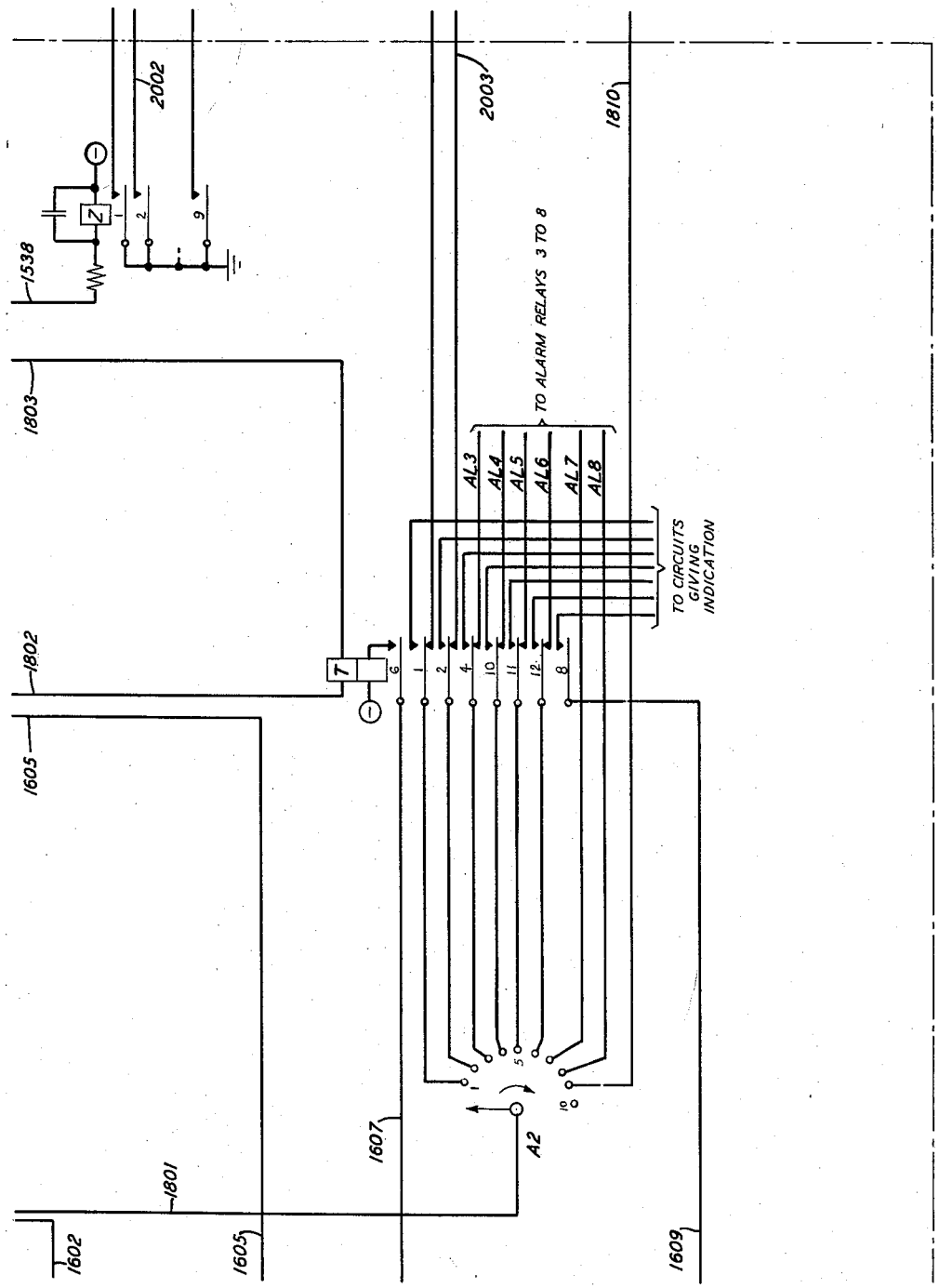

Each substation is provided with a pair of thermal time delay relays not previously mentioned. These are shown in Figs. 9 and 15 as the Filter-Out relay FO and the Filter-In relay FI, which are normally operated from ground on contacts 6 and 8 of the line relay A(10) over leads 915 and 918 to their operating windings as shown at the first substation, for example. These relays are not normally released during pulsing because of the time delay feature. The release times of the FO and FI relays differ by ten seconds. In the event of a substation equipment failure, these relays will be de-energized. As a result the FI relay releases about 20 seconds after the occurrence of the equipment failure and in so doing shunts the 2600-cycle series-resonant trap 2103 shown in detail in Fig. 21, located in the band-elimination network 1104 in the first substation for example, by way of leads 910, 912, and 913. The operation of this trap blocks the 2600-cycle tone on the line returning to the main station. After an additional ten seconds the FO relay releases, thereby removing the trap. These operations result in a reduction of about 15 decibels in the tone received at the main station for ten seconds. This acts as an alarm alert to which the main station responds as for a line open scan which results in the operation of the major audible alarm. The line open scan is effected in the manner previously described.

It may be noted that the far-end substation circuit does not include a band-elimination filter, as do all the intermediate substations, but it does include the FO and FI relays. A far-end substation equipment failure is reported by partially shorting out the bandpass filter 1511 as shown in Fig. 22. At the far-end substation the released FO and FI relays in Fig. 15 connect leads 1510 1512 and 1513 in shunt with resistor 2203 of the bandpass filter network as further shown in Fig. 22. This shunting attenuates the returned 2600-cycle signaling tone sufficiently to cause the main station to initiate a line open scan in the same manner as the interruption of the tone path at an intermediate substation.

In order to determine at the main station which substation is in trouble, a roll call, as previously described, is made. The result of the roll call is that all the station lamps at the main station will be lit except the one corresponding to the substation having the equipment failure. That substation cannot revert the tone pulses for the very reason of the failure of its signaling equipment.

*Signaling the main station from a substation*

It is from time to time desirable to be able to communicate by voice from one of the substations to the main station, and in order to alert the main station to the fact that it is desired to call from a substation means are provided in the system of this invention whereby a person working at one of the substations may ring down the main station. Each substation is provided with a Signal Main Station key, such as that shown in Fig. 11 at the first substation or in Fig. 17 at the far-end substation.

The Signal Main Station key is connected at all substations to the ninth position of the A–1 bank of the selector switch, and includes three sets of contacts. When the key is operated to call in the main station, at the first substation, for example, the left-hand contacts close to prepare an operating path for the STA(10) relay from the ninth level of the A–1(11) bank of the selector switch by way of leads 1107, 1105 and 939 to the operating winding of the STA(10) relay. The middle set of contacts prepares a path for connecting the P(9) relay to the eighth level of the A–1(11) bank of the selector switch by way of leads 1108 and 929. The third set of contacts on the key includes a make and a break set. To the break set are connected a capacitor 1109, a resistor 1110 and positive 130-volt battery. By way of this set the capacitor has become charged to the voltage of the positive battery. Upon operation of the key the capacitor 1109 is disconnected from resistor 1110 and is connected instead by way of leads 1111 and 1119 to the grid of the gas tube 1114. Capacitor 1109 discharges to ground through resistor 1117, thereby delivering an impulse of voltage to the grid of the gas tube 1114 through resistor 1115 and varistor 1116 to ionize it. The ionized tube 1114 conducts current from the positive battery at its anode by way of leads 1002 and 941 to the upper winding of the OP(9) relay, which is already connected to ground by way of lead 936, break-contact 6 of the B(10) relay, lead 1017 and break-contact 2 of the STA(10) relay. The operation of the OP(9) relay causes its break-contact 7 to open and its make-contact 8 to close, thereby placing the band-elimination network 1104 in a condition to block the transmission of 2600-cycle tone to the main station in the same manner as the operation of an alarm relay.

The main station responds to the loss of incoming signaling tone by placing ground on lead E to operate the A(6) relay. By the same series of operations previously described for alarm reporting, the main station commences a station identification scan.

On the eighth pulse of the station identification digit the selector switch at the substation at which the Signal Main Station key is held operated, the P(9) relay is caused to operate over the path previously outlined to close the signal reverting path through that station back to the main station. The ninth pulse of the digit is therefore reverted to the main station. The ninth pulse also operates the STA(10) relay at the substation to lock up the OP(9) relay on its lower winding by way of lead 935 and make-contact 6. The operation of the STA(10) relay also allows the gas tube 1114 to deionize.

When the ninth pulse of the station identification digit has been reverted to the main station, the main station selector switch has only been advanced to its eighth position. The eighth position of the A–1(5) bank of the selector switch is connected by way of lead 545 to the upper winding of the L(5) relay, which is also connected to negative battery on contact 8 of the A(6) relay by way of leads 546 and 527, contact 7 of the released B(7) relay and lead 636. Therefore, the L(5) relay operates when the ninth pulse is received to the main station. The SP(6) relay is also connected by way of contact 6 on the H(5) relay to battery on contact 8 of the A(6) relay at this time and consequently the pulse generator stops. The L(5) relay locks through its own contact 10 to ground on contact 5 of the cutout relay CO(5). The Answer lamp is also operated by the L(5) relay on its contact 2, and on its contact 4 negative battery is extended to an audible alarm circuit to indicate that the main station is being signaled from one of the substations. The audible alarm is silenced and the L(5) relay released by plugging in a phone to the jack circuits which operates the CO(5) relay on its sleeve contacts.

In the meantime, the L(5) relay has extended ground on its contact 8 over lead 538, contact 7 of the released C(7) relay, contact 9 of the G(7) relay, lead 525, contact 5 of the released ZB(5) relay, contact 7 of the released Z(5) relay and lead 520 to the operating winding of the H(5) relay. The operated H(5) relay causes the transmission of the second scanning digit to the substations, but inasmuch as there are no alarm conditions at any of the substations eleven pulses will be transmitted, and the SP(6) relay will be operated on the tenth position of its selector switch to stop the pulsing, restore all relay circuits to normal and return steady state to the alarm loop. Conversation may now be carried on over the order wire circuit in the normal manner.

Provision is made for signaling the main station only from one of the substations, and no corresponding provision is made for signaling from one substation to another. However, one substation may be called by voice from another substation, as there is provided a loudspeaker at each of the substations. Similarly, the main station can voice call any substation when desired.

*Summary of alarm and control functions*

For convenience, Table A below gives a summary of the alarm and control operating characteristics of the alarm and control system of this invention. The several operating orders which may be transmitted from the main station to a substation are identified as to the keys that need to be operated, the number of digits to be pulsed, the number of digits to be reverted from the substations, and the visual registration provided at the main station. The automatic identification and scanning features are also summarized as to the number of digits pulsed, the digits of the reverted pulse, and type of visual registration.

is essentially independent of order wire communication. When no signaling is taking place, continuous tone is present on the line but is rendered barely audible in the telephone receivers of the order circuit by the band-elimination network that is switched into the voice path by the inband signaling receiver whenever tone is being received. The interfering effect of this continuous low level tone is negligible to a listener and a slight distortion resulting from the attenuation of speech components near 2600 cycles is unobjectionable for an order wire circuit. During alarm and control signaling, however, the signaling tone is pulsed and in addition the signal power is increased about 12 decibels over the power of the steady tone in the idle condition. The interfering effect of these high level pulses is too severe for the

TABLE A

*Alarm and control features and their characteristics*

| Orders | Number of pulses/digit | | | Digits of reverted pulse | Visual registration (lamps) | Keys depressed | |
|---|---|---|---|---|---|---|---|
| | 1st digit | 2nd digit | 3rd digit | | | 1st digit | 2nd digit |
| Alarm scan | 2-8 | 11 | [1]11 | 2nd and 3rd | Alarm | Station | Alarm scan. |
| Close loop | 2-8 | 8 | | | | do | Close loop. |
| Indication scan | 2-8 | 7 | 11 | 3rd | Indication | do | Ind. scan. |
| Open loop | 2-8 | 9 | | | | do | Open loop. |
| Order 1 thru 5 | 2-8 | 2-6 | | | | do | Order. |
| Roll call | 10 | 11 | | 2nd | Station | Roll call | Alarm scan. |
| Automatic identification and scanning: | | | | | | | |
| Auto. alarm scan | 2-8 | 11 | [1]11 | 1st, 2nd, 3rd | Station alarm | | |
| Equipment failure | 11 | | | | Line open | | |
| Line open | 11 | | | | do | | |
| Service call | 9 | 11 | | 1st | Answer | Signal main station. | |

[1] This digit is generated only for substations having more than 9 alarms.

*Order wire operation*

The order wire constitutes a four-wire multistation private line facility for two-way voice communication between the main station and any or all of the substations. All stations employ four-wire telephone sets, the transmitting circuits of which are connected to the incoming side of the four-wire line with respect to the main station and the receiver circuits are connected to the outgoing side. At the main station the two paths, incoming and outgoing, are connected together through a two-wire bridge 21 as shown in Fig. 1. The normal talking path between any two stations includes this bridge at the main station since all transmitters are connected to the incoming line and all receivers are connected to the outgoing line. At each of the substations incoming signaling tone and voice currents are tapped off the line outgoing from the main station by the hybrid coil 35 at the first substation in Fig. 1 for example, and they are amplified together in voice-frequency amplifier 36 to a level suitable for operating the inband signaling receiver and the telephone receiver. Up to this point the transmission path is common to both speech and signaling tone. The inband signaling receiver includes its own voice amplifier from which signaling tone is blocked. Therefore, only the voice currents themselves are fed to the telephone circuit proper.

The bandpass networks in the reverting path at each of the substations are adjusted to pass signaling tone only, and therefore prevent speech currents from circulating through the reverting path back to the main station. At the same time the band-elimination networks which may be inserted in the incoming line at any of the substations when an alarm condition arises are designed to transmit speech currents but to block the 2600-cycle signaling tone. Therefore, the transmission path may be used as an order wire even though one of the band-elimination networks is connected in the incoming line.

In the alarm system of this invention alarm signaling order circuit to be used for talking at the same time. For this reason the through path of the talking circuits at the substation is terminated at the telephone bridging networks under the control of the D relay during pulsing. The intervals during which signaling intereferes with calls on the order wire circuit are generally of short duration.

At the far-end substation the order wire circuit may be either terminated by the 600-ohm termination 59 in Fig. 2, or a four-wire terminating set may be substituted therefor for the purpose of extending the order wire circuit off the route of the alarm system.

Inasmuch as the order wire is a four-wire circuit which includes a loop through the bridge at the main station, communication between substations is impossible when the line between the main station and the substation is open. To permit continued order wire operation between substations beyond the open line a bridging key, such as that shown in Fig. 9 at the first substation, is provided. When this key is operated the incoming line toward the main station is terminated in a resistor and the incoming line at the substation is looped directly to the outgoing line through the hybrid coil 35 (Fig. 1). At this time continued order wire operation is made possible between substations remote from the break in the line.

The main station and each substation are provided with both telephone handsets and amplifier-powered loudspeakers. Listening may be done optionally from either the loudspeaker or from the handset. A loudspeaker key is provided at the main station as shown in Fig. 6 for connecting the loudspeaker to the telephone circuit 701 as desired.

It should be understood that the alarm, control, and order wire system of this invention is not specifically limited to the details of the disclosed system, which is described herein solely by way of illustration, but may take other forms, for example, by expanding it to control more than seven substations, within the spirit and scope

What is claimed is:

1. In an alarm signaling system, a main station, a plurality of subsidiary stations, a signaling channel forming a loop linking all of said subsidiary stations to said main station and closed through a far-end subsidiary station, signal transmitting means at said main station included in said signaling channel for normally applying a signaling frequency to said channel, receiving means at said main station and at each subsidiary station bridged on said signaling channel and normally operated by said signal frequency, alarm devices at each subsidiary station, means under the control of any one of said alarm devices for blocking the return of said signal frequency on said loop to the receiving means at said main station, and means under the control of said receiving means at said main station responsive to the blocking of said signal frequency to indicate the operation of said alarm device.

2. The alarm signaling system as set forth in claim 1 having a stepping switch at said main station and at each of said subsidiary stations, means under the control of the indicating means at said main station for stepping all of said switches, and means under the joint control of one of said stepping switches and an operated one of said alarm devices for again connecting said signal frequency to the receiving means at said main station to identify the subsidiary station at which said alarm device is located.

3. The alarm signaling system as set forth in claim 2 in which the stepping switches are stepped in response to pulses of said signal frequency transmitted from said main station, a preparatory relay at each subsidiary station, a circuit for said relay prepared at a position of a subsidiary station stepping switch individual to each subsidiary station, means under the control of said operated alarm device for operating said preparatory relay when said subsidiary station stepping switch reaches said individual position, and means under the control of said operated preparatory relay responsive to the next pulse from the main station to reconnect said signal frequency to the receiving means at said main station to identify the subsidiary station at which said operated alarm device is located.

4. The alarm signaling system as set forth in claim 3 and means for causing the stepping switch at said main station to step one pulse behind the stepping switches at said subsidiary stations in response to transmitted pulses of a series comprising relay means associated with said indicating means for absorbing the first pulse of a series and for preventing the stepping switch at said main station from stepping in response to said first pulse whereby the pulsing speed of said system is rendered substantially independent of the time delays inherent in said receiving means.

5. The alarm signaling system as set forth in claim 2 in which said stepping switches have at least a second bank of terminals connected to a plurality of alarm devices at said subsidiary stations, a corresponding plurality of alarm registration devices at said main station, means for restoring all said stepping switches to normal after said alarmed subsidiary station has been identified at said main station, means at said alarmed subsidiary station for transferring said preparatory relay from its individual connection to said first bank of stepping switch terminals to the brush of said second bank of terminals, means at said main station for transferring the stepping switch thereat to said individual alarm registration devices, means for stepping said stepping switches at said main station and at said alarmed substation in response to a second series of pulses of said signal frequency transmitted from said main station, and means under the control of each individual operated alarm device at said alarmed subsidiary station for operating said preparatory relay when said subsidiary station stepping switch reaches the individual position at which an operated alarm device is connected for reconnecting the next succeeding pulse of said signal frequency to the receiving means at said main station whereby the operation of said individual alarm devices at said subsidiary station is registered on said alarm registration devices at said main station.

6. The alarm signaling system as set forth in claim 5 and means for precluding the stepping switches at non-alarmed subsidiary stations from responding to said second series of pulses comprising a lockout relay at all subsidiary stations, and means for operating said lockout relays at all non-alarmed subsidiary stations on the same pulse that identifies said alarmed subsidiary station.

7. The alarm signaling system as set forth in claim 5 and means at all subsidiary stations for holding operated thereat all alarm devices which operate while another subsidiary station is reporting its alarm conditions to said main station.

8. In an alarm signaling system, a main station, a plurality of substations, an outgoing signaling channel linking said main station to all of said substations, an incoming signaling channel linking all of said substations to said main station, means for normally closing said outgoing channel to said incoming channel at the most remote of said substations thereby forming a closed transmission loop terminating at said main station, a signal transmitter at said main station connected to said outgoing channel, a signal receiver bridged to said outgoing channel at each of said substations, a further signal receiver bridged to said incoming channel at said main station, director means at said main station for causing said signal transmitter normally to apply a steady alternating-current tone signal to said outgoing channel whereby all of said signal receivers are held operated, station-identifying means at each substation, a plurality of station-registering devices at said main station, a plurality of alarm reporting devices at each of said substations, a corresponding plurality of alarm registering devices at said main station, a tone-blocking filter at each substation connectable in said incoming channel, means at each substation for connecting said tone-blocking filter in series with said incoming channel upon the operation of any one of the alarm devices thereat whereby said main station signal receiver is released and in response thereto said director means causes said signal transmitter to remove tone from the outgoing line as a seizure signal and to transmit a first series of spaced pulses of said signal tone alternating current, means at each of said substations for counting the number of times the signal receiver releases at the end of each of said pulses, a normally open signal tone reverting path at each substation for bridging said outgoing channel to said incoming chanenl at that substation, means at each substation for closing said reverting path in response to counting a preassigned individual number of said pulses and under the control of an operated alarm device thereat whereby the next succeeding pulse is reverted to said main station to operate the signal receiver thereat and cause said director means to stop the transmission of said first series of pulses, to register the number of said alarmed substation, and to start the transmission of a second series of spaced pulses to the alarmed substation only, means at said alarmed substation for scanning in sequence its plurality of alarm devices in response to said second pulse series, means at all other substations for preventing any response to said second pulse series, means for temporarily closing said reverting path through the alarmed substation to revert a tone pulse to said main station for each operated alarm device thereat, and means at said main station for indicating on said plurality of alarm registering devices the condition of the corresponding alarm devices at said alarmed substation for each reverted tone pulse of said second series.

9. The alarm signaling system as set forth in claim 8 and an order wire talking circuit comprising said outgoing and incoming channels, a telephone receiver at each substation bridged to said outgoing channel, a telephone transmitter at each substation bridged to said incoming channel, a resistive bridge joining said outgoing channel to said incoming channel at said main station, a further telephone receiver connected at said main station by way of said bridge to said incoming channel, and a further telephone transmitter connected at said main station by way of said bridge to said outgoing channel.

10. The system set forth in claim 9 and means for closing the order wire talking path through a substation when one of said channels is open to the main station comprising a line bridging key operable to connect said outgoing channel directly to said incoming channel.

11. In combination, a main station, a plurality of intermediate substations, a far-end substation, a transmission loop terminating at said main station, linking all said substations, and closing through said far-end substation, a signal transmitter applying signal tone of a single frequency at said main station to one terminal of said loop, a signal receiver at said main station connected to the other terminal of said loop and held operated by said tone, a station-identifying device and a plurality of alarm devices at each substation, a plurality of station-indicating devices and a plurality of alarm-indicating devices at said main station, means at each of said substations under the control of any of said alarm devices for opening said loop to said tone whereby said main station signal receiver in response to the loss of said tone operates to cause the transmission of pulsed interruptions of said tone to scan said substation identifying and alarm devices, means at each of said substations for closing the loop therethrough to revert a tone pulse to said main station for identifying itself when any of its alarm devices is operated and for reporting its operated alarm devices to said main station, and means at said main station for operating said corresponding station-indicating and alarm-indicating devices in response to each reverted tone pulse.

12. In an alarm signaling system, a main station, a plurality of subsidiary stations geographically remote from said main station and extending in one direction therefrom, a signaling loop connecting all said stations and extending outwardly from said main station through all said subsidiary stations, closed through the last of said subsidiary stations, and returning inwardly through all said subsidiary stations to said main station, a stepping switch at each subsidiary station, each of said switches having a first bank of terminals including a station-identifying terminal individual to each subsidiary station and a plurality of other terminals and a second bank of terminals, a signal transmitter connected to the outward terminal of said loop at said main station for normally applying a steady signaling tone of a single frequency in the voice-frequency band to said loop, said steady tone preventing the stepping of said switches, a plurality of trouble registering devices connected to said second bank at each of said subsidiary stations, means under the control of any of said trouble registering devices to mark the station-identifying terminal of said first bank at a subsidiary station and to signal said main station by blocking the inward transmission of steady tone thereto, means at said main station responsive to the blocking of said steady tone for removing said steady tone from the outward terminal of said loop and then causing said transmitter to pulse said tone, means at all stations under the control of said pulsed tone for stepping all switches simultaneously, means operated when a switch at a marked subsidiary station is stepped to said individual station-identifying terminal to close said loop through that station and return a pulse to said main station, means operated when a switch at an unmarked subsidiary station is stepped to one of the other terminals of said first bank to render those substations nonresponsive to further tone pulses, a relay at each subsidiary station operated from said individual station-identifying terminal for transferring connections from said first bank of terminals to said second bank, a plurality of station registering devices at said main station, means operated by said returned pulse at said main station for stopping said tone pulsing and for operating a particular one of said station-registering devices thereat, means for causing said transmitter to pulse said tone a second time, said second pulsing being followed only at said marked subsidiary station, a plurality of trouble-identifying devices at said main station, and means operated during said second pulsing at said marked subsidiary station under the control of an operated trouble-registering device to return certain of said second pulses to said main station to operate the corresponding trouble-identifying devices thereat.

13. The alarm signaling system as set forth in claim 12, a signaling key at each of said subsidiary stations and means under the control of said key for interrupting the transmission of steady tone to said main station thereby causing said main station to pulse said tone and identify the subsidiary station at which said signal key is operated.

14. The alarm signaling system as set forth in claim 12, a plurality of station keys at said main station for calling in an individual one of said subsidiary stations, and means controlled by each of said keys for pulsing the tone from said signal transmitter the preassigned number of times to call in a given subsidiary station.

15. The alarm signaling system as set forth in claim 14, and means for maintaining said system in condition for receiving alarm reports substantially continuously comprising at said main station slow-operating relay means having a preset operating time for automatically restoring steady signaling tone to said signaling loop upon the expiration of a predetermined delay time following the calling in of a subsidiary station.

16. The alarm signaling system as set forth in claim 14, a plurality of order keys at said main station, a corresponding plurality of order relays at each of said subsidiary stations, means for transferring the connections on said first bank of terminals of said stepping switches at said subsidiary stations to said plurality of order relays upon the calling in of that station, and means controlled by said order keys for pulsing the tone from said signal transmitter the preassigned number of times to actuate a desired order relay.

17. The alarm signaling system as set forth in claim 16 in which one of said order keys is a manual alarm scanning key, and means under the control of said scanning key for causing said signal transmitter to pulse said tone thereby stepping the switches over all terminals of the second bank of a given subsidiary station to operate the corresponding trouble-identifying devices at the main station by returning a pulse for each operated trouble-registering device at said subsidiary station.

18. The alarm signaling system as set forth in claim 16 in which one of said order keys is an open loop key, a relay at each of said subsidiary stations connected to a preassigned other terminal on the first bank of said stepping switches for opening the tone-returning path therethrough, and means operated under the control of said open loop key at said main station for pulsing said signal transmitter the preassigned number of times required to step the switch at a given subsidiary station and operate said last-mentioned relay.

19. The alarm signaling system as set forth in claim 16 in which one of said order keys is a close loop key, a relay at each of said substations connected to a preassigned other terminal on the first bank of said stepping switches for closing a tone-returning path therethrough and means operated under the control of said close loop key at said main station for pulsing said signal transmitter the preassigned number of times required to step the switch at a given subsidiary station and operate said last-mentioned relay.

20. The alarm signaling system as set forth in claim 16 in which one of said order keys is a roll call key, a relay at each of said subsidiary stations connected to a preassigned other terminal on the first bank of the stepping switches for enabling a tone-returning path under the control of said individual station-identifying terminal on the first bank of the stepping switches when said switches are stepped a second time, and means operated under the control of said roll call key for pulsing said signal transmitter the preassigned number of times required to step the switches at all subsidiary stations simultaneously and operate said last-mentioned relays thereby returning pulses to said main station to operate said station-registering devices.

21. The alarm signaling system as set forth in claim 16 in which one of said order keys is an indication scanning key, a plurality of indicating devices at each of said subsidiary stations showing the status of preassigned circuit conditions thereat, a corresponding plurality of indication-registering devices at said main station, a transfer relay at each of said subsidiary stations connected to a preassigned other terminal on the first bank of said stepping switches for connecting the second bank of said stepping switches to said indicating devices instead of said trouble-registering devices, means at said main station under the control of said indication scanning key and a returned pulse from a given subsidiary station for operating said indication registering devices and further means operated under the control of said indication scanning key for causing said signal transmitter to pulse a first and second series of pulses, said first series of pulses being of the preassigned number required to step the switch at a given subsidiary station and operate said transfer relay and said second series being sufficient to step the switches at a given subsidiary station over the terminals of said second bank to return a pulse to said main station for each operated indicating device.

No references cited.